US008944015B2

(12) United States Patent
Reisser

(10) Patent No.: US 8,944,015 B2
(45) Date of Patent: Feb. 3, 2015

(54) ROTARY PISTON INTERNAL COMBUSTION ENGINE

(76) Inventor: Heinz-Gustav A. Reisser, Coshocton, OH (US)

(*) Notice: Subject to any disclaimer, the term of this patent is extended or adjusted under 35 U.S.C. 154(b) by 433 days.

(21) Appl. No.: 12/849,406

(22) Filed: Aug. 3, 2010

(65) Prior Publication Data
US 2010/0307449 A1 Dec. 9, 2010

Related U.S. Application Data

(63) Continuation-in-part of application No. 12/197,522, filed on Aug. 25, 2008, now Pat. No. 8,033,265, which is a continuation-in-part of application No. 11/304,608, filed on Dec. 16, 2005, now Pat. No. 7,415,962.

(51) Int. Cl.
*F01C 1/07* (2006.01)
*F02B 53/00* (2006.01)
*F02B 75/00* (2006.01)
*F02B 75/28* (2006.01)
*F01B 7/12* (2006.01)
*F01B 7/14* (2006.01)
(Continued)

(52) U.S. Cl.
CPC ............... *F01C 9/002* (2013.01); *F01C 11/008* (2013.01); *F01C 17/06* (2013.01); *F01C 21/008* (2013.01); *F02B 53/02* (2013.01); *F01C 17/066* (2013.01); *F02B 33/44* (2013.01); *F02B 37/00* (2013.01); *F04C 2240/30* (2013.01); *F04C 2240/50* (2013.01); *Y02T 10/17* (2013.01)
USPC ...................................... 123/18 R; 123/51 R

(58) Field of Classification Search
CPC .......... F01C 1/02; F01C 17/02; F01C 21/008; F01C 9/002; F02B 53/00; F02B 53/02
USPC ........... 123/245, 18 R, 18 A, 241, 43 R, 45 R
See application file for complete search history.

(56) References Cited

U.S. PATENT DOCUMENTS 1,095,034 A 4/1914 Sanchez et al.
1,348,675 A 8/1920 Weed
(Continued)

FOREIGN PATENT DOCUMENTS

DE 3305852 A1 8/1984
DE 4209444 9/1993
(Continued)

OTHER PUBLICATIONS

Scavenging Characteristics of a Two-Stroke-Cycle Engine as Determined by Skip-Cycle Operation, Ku et al, Journal of Research of the National Bureau of Standard, vol. 57, No. 6, Dec. 1956.*
(Continued)

*Primary Examiner* — Kenneth Bomberg
*Assistant Examiner* — Deming Wan
(74) *Attorney, Agent, or Firm* — Kegler Brown Hill & Ritter; James J. Pingor

(57) ABSTRACT

A steam engine or an internal combustion engine, and more particularly with a rotary geometry, is provided with the engine having multiple combustion chambers delimited by piston heads and an engine housing that defines at least a section of a torus. The engine exhibits improved performance and reduced weight.

27 Claims, 25 Drawing Sheets

(51) Int. Cl.
*F01C 9/00* (2006.01)
*F01C 11/00* (2006.01)
*F01C 17/06* (2006.01)
*F01C 21/00* (2006.01)
*F02B 53/02* (2006.01)
*F02B 33/44* (2006.01)
*F02B 37/00* (2006.01)

(56) References Cited

U.S. PATENT DOCUMENTS

| | | |
|---|---|---|
| 1,428,858 A | 9/1922 | Porter |
| 1,497,481 A | 6/1924 | Bullington |
| 1,568,053 A | 1/1926 | Bullington |
| 2,075,654 A * | 3/1937 | Martin ............ 418/33 |
| 2,123,279 A * | 7/1938 | George et al. ............ 74/48 |
| 2,124,327 A | 7/1938 | Wolstenholme |
| 2,167,946 A | 8/1939 | Gray |
| 2,264,648 A | 12/1941 | Tebalpi |
| 2,303,025 A | 5/1942 | Cliff |
| 2,413,589 A | 12/1946 | Snyder |
| 2,416,846 A | 3/1947 | Richter |
| 2,651,206 A * | 9/1953 | La Veille ............ 74/25 |
| 3,258,618 A | 6/1966 | Spier |
| 3,292,602 A | 12/1966 | Stewart |
| 3,307,525 A | 3/1967 | McClure |
| 3,396,632 A | 8/1968 | LeBlanc |
| 3,580,228 A | 5/1971 | Rocha et al. |
| 3,645,239 A | 2/1972 | Cena |
| 3,702,746 A | 11/1972 | Parmerlee |
| 3,822,971 A * | 7/1974 | Chahrouri ............ 418/36 |
| 4,072,447 A | 2/1978 | Gaspar |
| 4,136,661 A | 1/1979 | Posson |
| 4,370,109 A | 1/1983 | Sabet et al. |
| 4,437,441 A | 3/1984 | Menioux |
| 4,738,235 A | 4/1988 | Silvoza |
| 5,199,391 A * | 4/1993 | Kovalenko ............ 123/43 B |
| 5,363,813 A * | 11/1994 | Paarlberg ............ 123/18 R |
| 5,527,165 A * | 6/1996 | Schadeck ............ 418/36 |
| 5,996,538 A | 12/1999 | Rocha et al. |
| 6,036,461 A | 3/2000 | Bahniuk |
| 6,082,313 A | 7/2000 | Leijonberg |
| 6,132,095 A * | 10/2000 | Crystal ............ 384/125 |
| 6,164,263 A | 12/2000 | Saint-Hilaire et al. |
| 6,230,671 B1 | 5/2001 | Achterberg |
| 6,321,693 B1 | 11/2001 | Kim et al. |
| 6,413,178 B1 * | 7/2002 | Chamberland ............ 474/19 |
| 6,467,954 B2 | 10/2002 | Honda et al. |
| 6,691,647 B2 | 2/2004 | Parker |
| 6,739,307 B2 | 5/2004 | Morgado |
| 7,600,490 B2 | 10/2009 | Reisser |
| 8,033,265 B2 * | 10/2011 | Reisser ............ 123/245 |
| 8,151,759 B2 * | 4/2012 | Wright ............ 123/233 |
| 8,176,892 B2 | 5/2012 | Reisser |
| 2002/0114718 A1 * | 8/2002 | Richards ............ 418/36 |
| 2005/0016493 A1 | 1/2005 | Hoose |
| 2007/0105465 A1 * | 5/2007 | Wolfsgruber et al. ...... 440/88 R |
| 2009/0064672 A1 * | 3/2009 | Rafalski, Jr. ............ 60/413 |

FOREIGN PATENT DOCUMENTS

| | | |
|---|---|---|
| JP | 5710702 A | 1/1982 |
| WO | 9733073 A1 | 9/1997 |

OTHER PUBLICATIONS

International Search Report—PCT/US2007/013115 (May 5, 2008).
PCT/US2009/054875 Written Opinion of the International Searching Authority dated Feb. 25, 2011.
PCT/US2009/054875 International Search Report dated Feb. 25, 2011.
PCT/US2006/46823 International Search Report dated Jan. 11, 2008.
PCT/US2006/46823 Written Opinion of the International Searching Authority dated Jan. 11, 2008.
JP 2008-545670 Appeal Board's Questioning by Japanese Patent Appeal Board dated Dec. 19, 2011.
DE 11 2006 003 398.0-13 Further Examination Report of the German Patent and Trademark Office dated Apr. 18, 2012.
US/2007/013115 Written Opinion of the International Searching Authority dated May 5, 2008.

* cited by examiner

ROTARY PISTON INTERNAL COMBUSTION ENGINE

CROSS REFERENCE TO RELATED APPLICATIONS

This application is a continuation-in-part of U.S. application Ser. No. 12/197,522 filed Aug. 25, 2008, which is a continuation-in-part of application Ser. No. 11/304,608, filed Dec. 16, 2005, now U.S. Pat. No. 7,415,962, the entire contents of which are hereby incorporated by reference.

FIELD

The present disclosure relates to internal combustion engines and, more particularly, to rotary internal combustion engines.

BACKGROUND

The statements in this section merely provide background information related to the present disclosure and may not constitute prior art. In conventional combustion engines, the walls delimiting combustion chambers are of a cylindrical shape and closed on one end with a cylinder head. A piston is moveably guided through the other end into the cylinder. Internal combustion engines have 4 basic steps: (1) intake; (2) compression; (3) combustion and expansion; and (4) exhaust. During the intake step, combustible mixtures are injected into the combustion chamber. This mixture is placed under pressure by the compression of the piston into the cylinder. The mixture is then ignited and burnt. The hot combustion products ultimately expand; forcing the piston to move in the opposite direction and causing the transfer of energy to mechanical components that are coupled or connected to the piston, such as a crank shaft. The cooled combustion products are finally exhausted and the combustion cycle restarts. Typical combustion engines operate according to this principle may function in two cycles or four cycles, such as in Otto and diesel engines.

There exists a continuing issue related to the relatively low efficiency exhibited by conventional combustion engines. Engine efficiency is usually defined by comparing the theoretical chemical energy in the fuels against the useful energy abstracted from the fuels in the form of the kinetic energy transferred through the engine.

Therefore, internal combustion engines that provide enhanced efficiency are continuously desired. It is further desirable that such an engine be more compact in size, lighter in weight, have a reduced need for internal lubrication, and be capable of being easily manufactured.

SUMMARY

The present disclosure provides a steam engine or an internal combustion engine that improves the efficiency, reduces the weight and size, and/or simplifies the ability to manufacture such an engine. In one form of the present disclosure, the engine has multiple rotary pistons that travel along a path of a partial to a complete torus.

According to one embodiment of the present disclosure, an engine used to drive a vehicle or accessory equipment is provided that includes multiple combustion chambers arranged in a toroidal geometry. Each combustion chamber is delimited by two piston heads positioned on different primary members that move in opposite directions and by the wall of a cavity located within a cylinder liner. A plurality of crankshafts is positioned within the diameter of the toroidal path of the primary members. The engine further comprises an intermediate sub-assembly having multiple sliding components that facilitates the movement of the primary members, a flywheel coupled to one crankshaft to force cooling air through the engine assembly, a pulley connected to another crankshaft for use in providing the power necessary to drive the vehicle or accessory equipment, and multiple injectors. Each injector is adapted to inject fuel into one of the combustion chambers.

According to another aspect of the present disclosure, more than one of the sliding components in the intermediate sub-assembly, primary members, piston heads, or cylinder liners in the engine assembly are made from a low friction material and adapted to allow the engine assembly to operate without the need for lubrication from an oil or other flowable lubricant.

Another aspect of the present disclosure is to provide a charged air system that utilizes the engine assembly of the present disclosure and is capable of operating with high efficiency when providing power to a vehicle or accessory equipment. The charged air system typically comprises exhaust ducting coupled to each cylindrical liner in the engine assembly for removing air from the engine assembly, inlet ducting coupled to each cylindrical liner for supplying air to the engine assembly; and a turbocharger connected to the exhaust ducting and the inlet ducting. The turbocharger is capable of supplementing the air in the exhaust ducting.

According to another aspect of the present disclosure, the charged air system may further include a supercharger adapted to further supplement the air in the exhaust ducting and/or a fill tank located in the inlet ducting that is configured to store a volume of air at a predetermined pressure in order to ensure that the air supplied to the engine assembly is at a constant and variable pressure.

Another aspect of the present disclosure is to provide a method of operating the engine assembly provided in the present disclosure. The method generally comprises providing an engine assembly having a plurality of combustion chambers with each combustion chamber being delimited by two piston heads and the wall of a cavity located in a cylinder liner. Each piston head and combustion chamber defines at least a section of a curved toroidal path with the piston heads adapted to move in opposite directions along this toroidal path. The fuel that is subsequently injected into the combustion chamber is combusted to release chemical energy and form combustion by-products. This release of chemical energy forces the piston heads and primary member coupled to each piston head to move, thereby, transforming the chemical energy into mechanical energy. The mechanical energy so generated is transmitted to at least one crankshaft that is coupled to the primary members. After the combustion by-products are vented from the combustion chamber, the piston heads are once again forced to move towards one another, thereby, delimiting the combustion chamber and restarting the process.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. It should be understood that throughout the description and drawings, corresponding reference numerals indicate like or corresponding parts and features.

DETAILED DESCRIPTION

Figure 1:
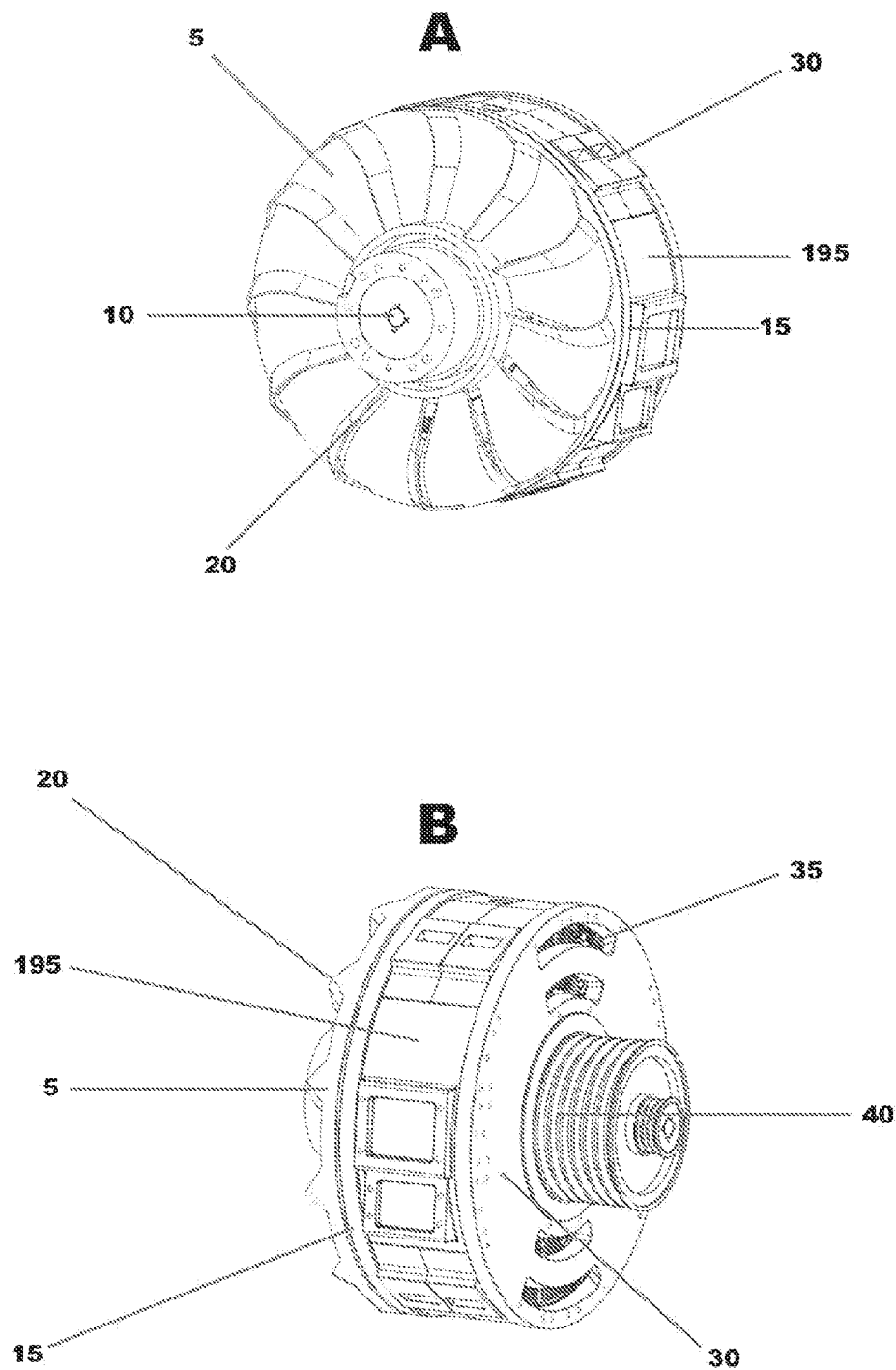
FIG. 1A is an anterior perspective view of an internal combustion engine constructed in accordance with the teachings of the present disclosure.
FIG. 1B is a posterior perspective view of an internal combustion engine constructed in accordance with the teachings of the present disclosure.

The following description is merely exemplary in nature and is in no way intended to limit the present disclosure or its application or uses. It should be understood that throughout the description and drawings, corresponding reference numerals indicate like or corresponding parts and features.

Figure 2:
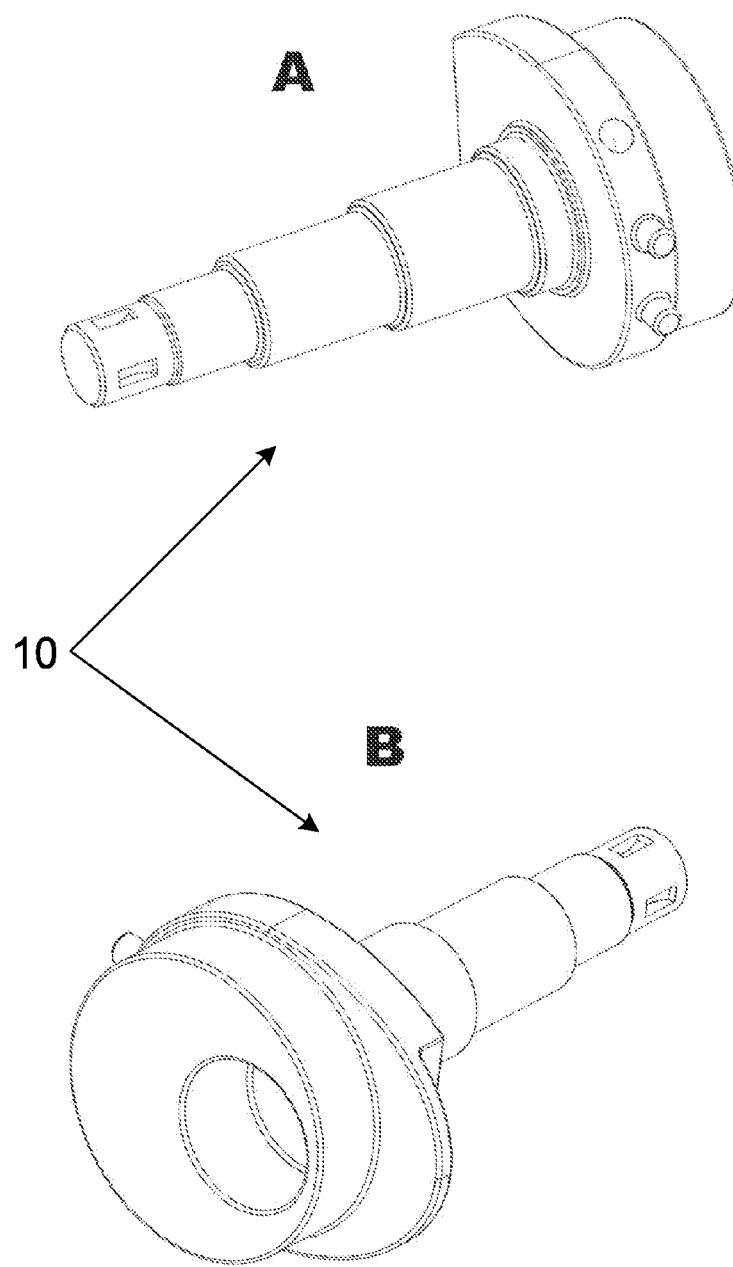
FIGS. 2A-2B are front and rear perspective view of the first crank shaft used in the construction of the engine depicted in FIGS. 1A-1B.
Figure 3:
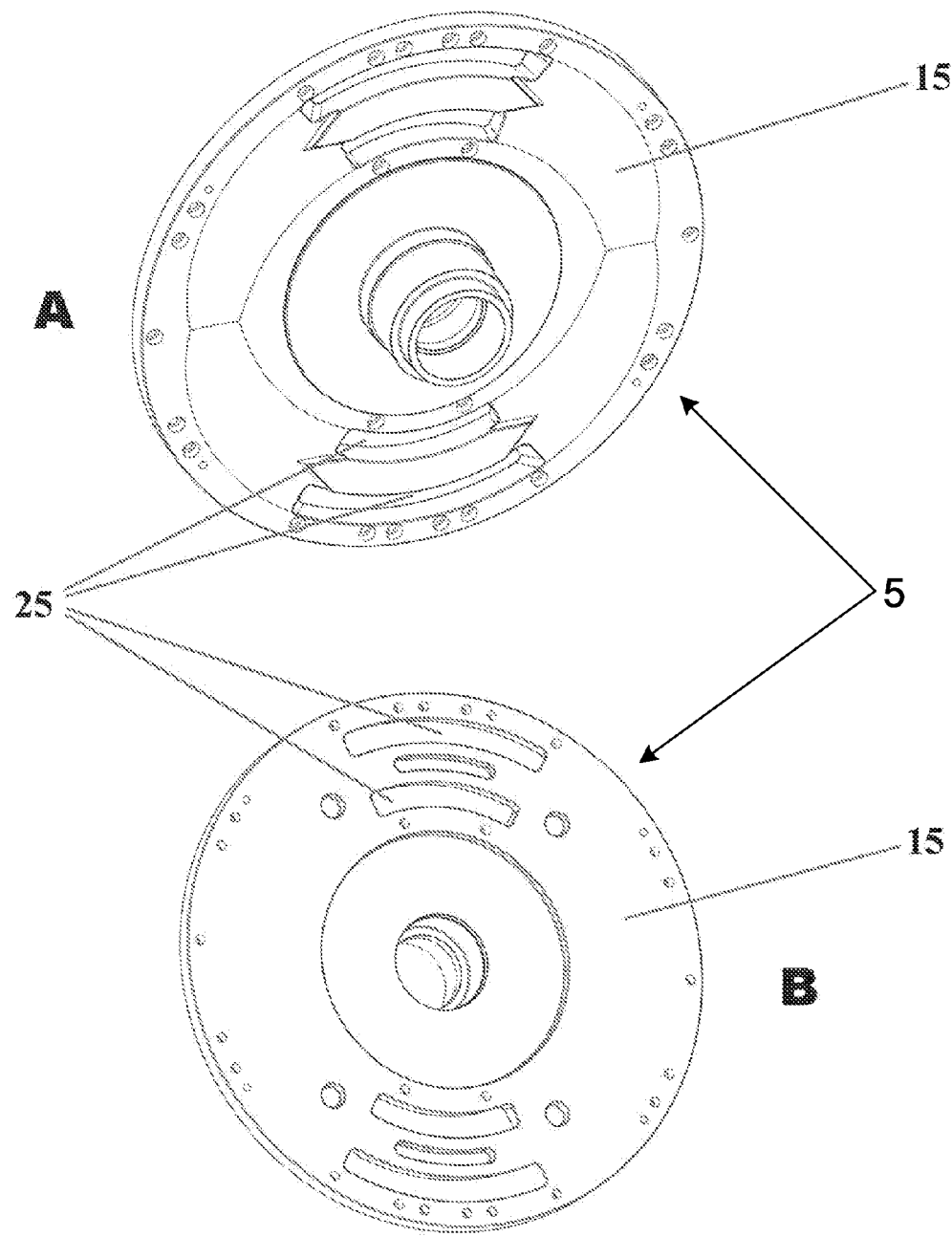
FIGS. 3A-3B are front and rear perspective views of a top plate used in the construction of the engine depicted FIGS. 1A-1B.
Figure 4:
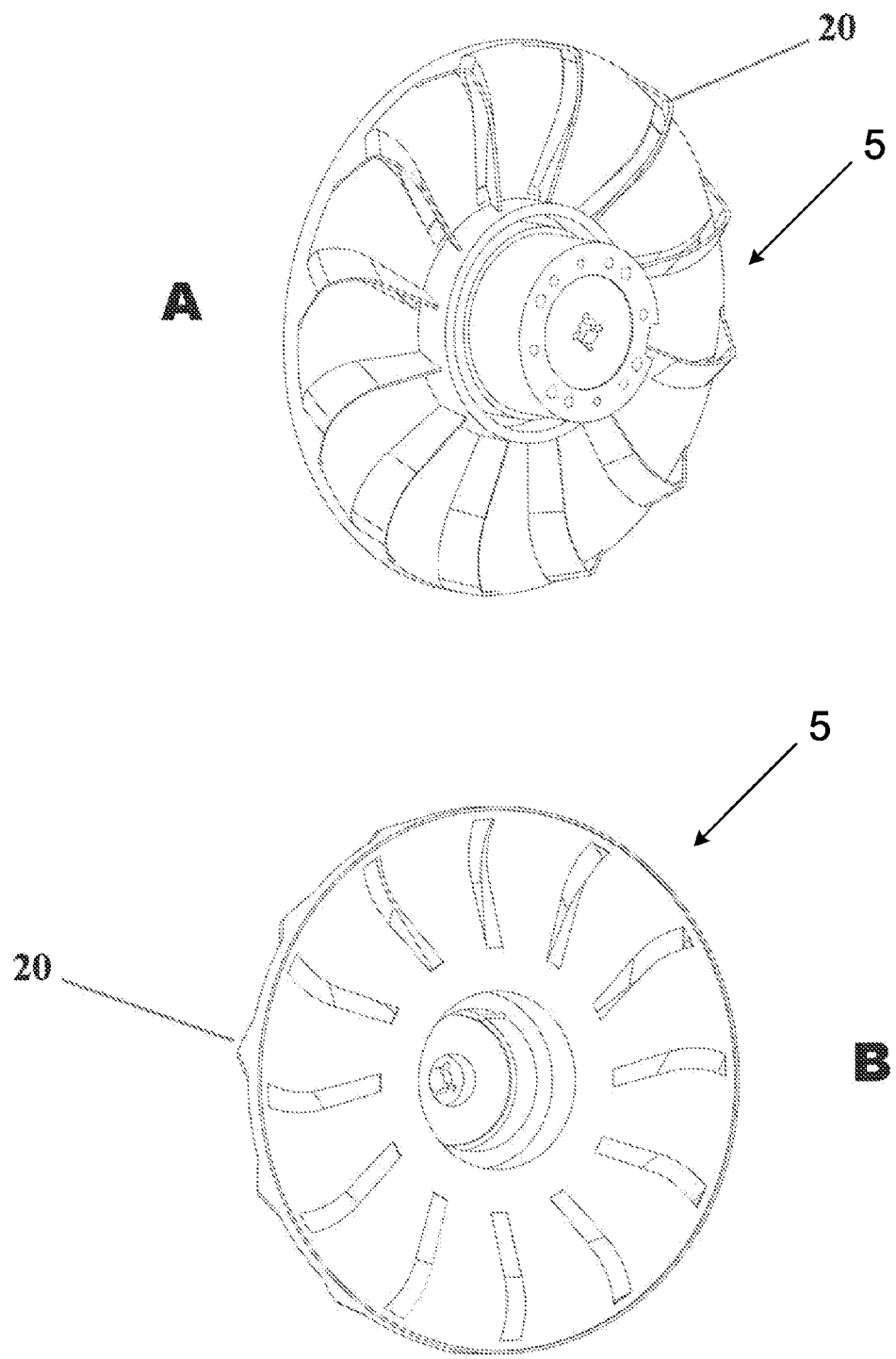
FIGS. 4A-4B are front and rear perspective views of a flywheel used in the construction of the engine depicted in FIGS. 1A-1B.

The present disclosure relates to a steam engine or an internal combustion engine, such as a two-cycle, a four-cycle, an Otto engine, and a diesel engine, among others. Referring to FIGS. 1A-1B, an impeller-like flywheel 5 is provided as part of the engine assembly 1 for air cooling purposes. The flywheel 5 is supported by a first crank shaft 10 (see FIGS. 2A-2B) and a top plate 15 (see FIGS. 3A-3B). The flywheel 5 houses a bearing arrangement that allows the top plate 15 to support most of the weight of the flywheel 5 in order to reduce any torsional and/or axial loads incurred by the first crank shaft 10 when the flywheel 5 rotates. The flywheel 5 (see FIGS. 4A-4B) includes multiple impeller-like fins 20 located along the circumference of its outer surface. Upon the rotation of the flywheel 5, these impeller-like fins 20 force air into the engine assembly through openings 25 present in the top plate 15 as shown in FIGS. 3A-3B. Preferably, a total of four openings 25 are present in the top plate 15 that allow air to flow into the engine assembly. However, one skilled-in-the-art will understand that a different number of openings may be utilized without exceeding the scope of this disclosure. The openings 25 are shaped and aligned in the top plate 15 in such a manner that each piston combustion chamber within the engine can be cooled by air flowing through two of the openings 25. The openings 25 may be concave or funnel shaped in order to facilitate the flow of air through the top plate 15 onto the surface of the piston combustion chambers.

Figure 5:
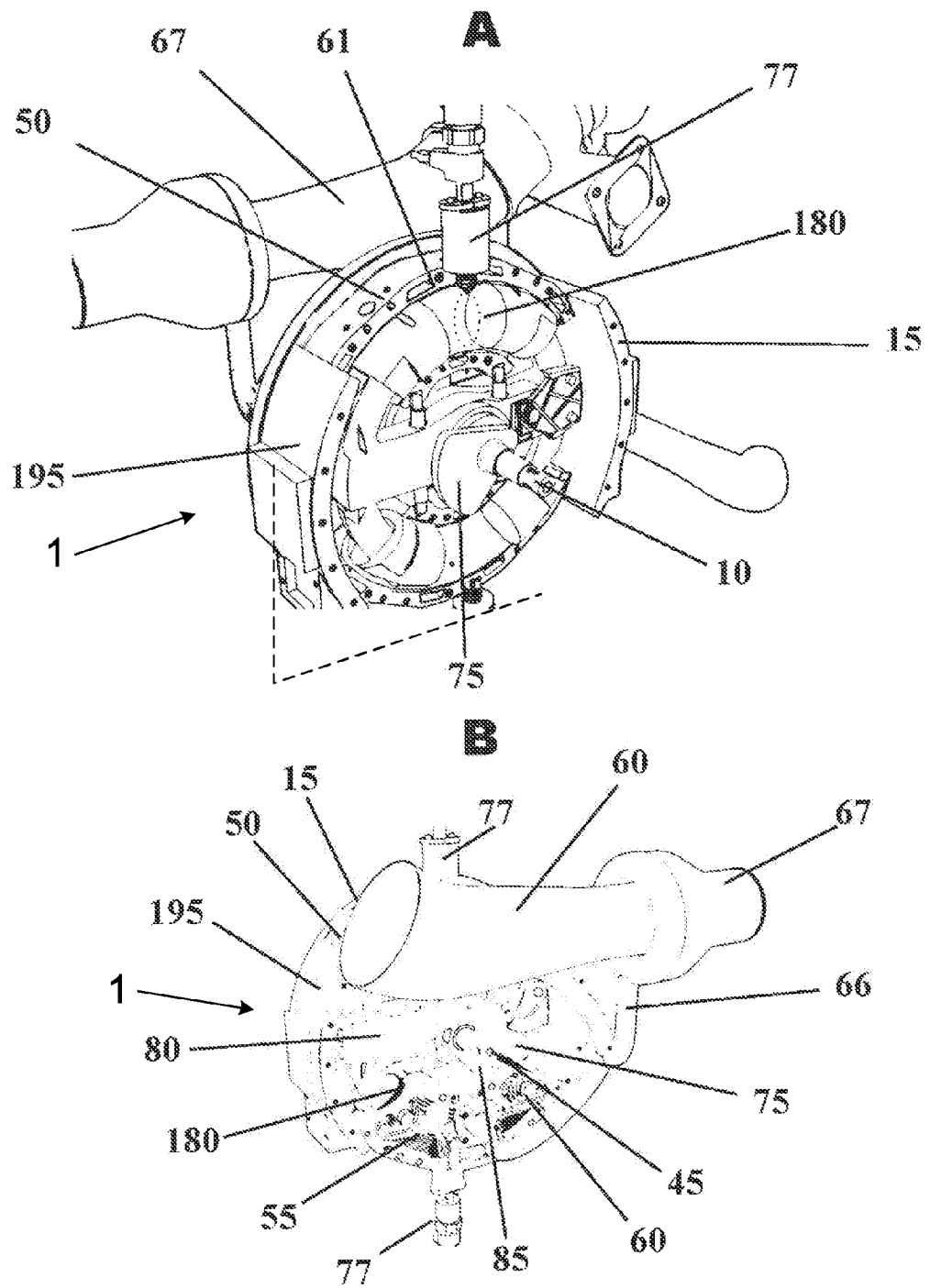
FIG. 5A is a fade-away, perspective view of the combustion engine of FIG. 1A emphasizing cooling air flow through the engine assembly.
FIG. 5B is a fade-away, perspective view of the combustion engine of FIG. 1B emphasizing cooling air flow through the engine assembly.
Figure 6:
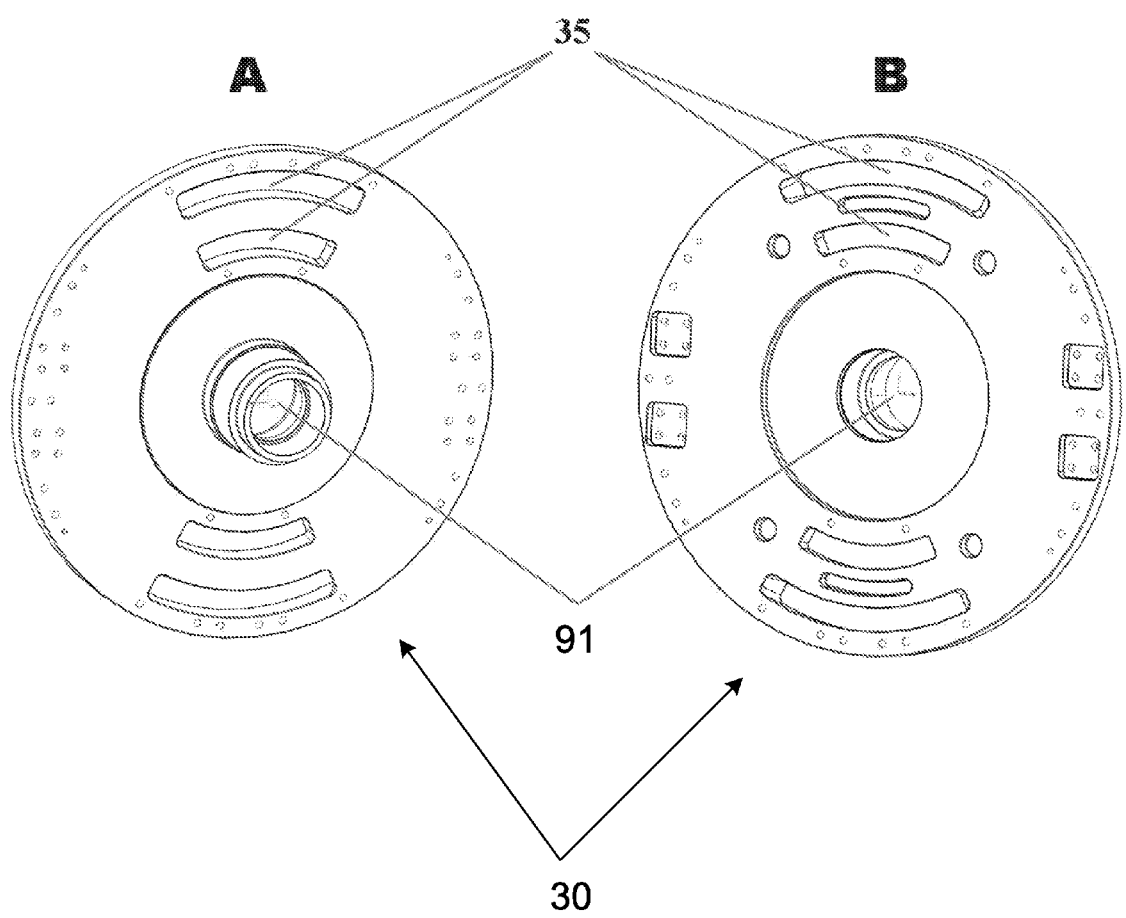
FIGS. 6A-6B are front and rear perspective views of a base plate used in the construction of the engine depicted in FIGS. 1A-1B.

Referring now to FIGS. 5A-5B, the air after it enters the engine assembly 1 through the top plate 15 flows around the cylinder liners 50, 55 containing the piston heads 180 and exits the engine assembly through openings 35 present in the base plate 30 (see FIG. 1B). The openings 35 in the base plate 30 are preferably similar in number and shape to the openings 25 present in the top plate 15 as shown in FIGS. 6A-6B. One skilled-in-the-art will understand that any number of entrance openings 25 and exit openings 35 may be utilized without departing from the scope of this disclosure. The upper 50 and lower 55 cylinder liners may include at least one air flow hole 61 to facilitate air flow around the cylinder liner and through the engine assembly 1. Upon exiting the engine assembly 1, the flow of air, may optionally be directed to flow into an exhaust duct 66 leading to a turbocharger (67). In this manner, the use of this air flow will add to the overall ambient pressure and air flow in the exhaust duct 66, thereby, enabling greater turbocharger 67 functionality at low rotations per minute.

Figure 7:
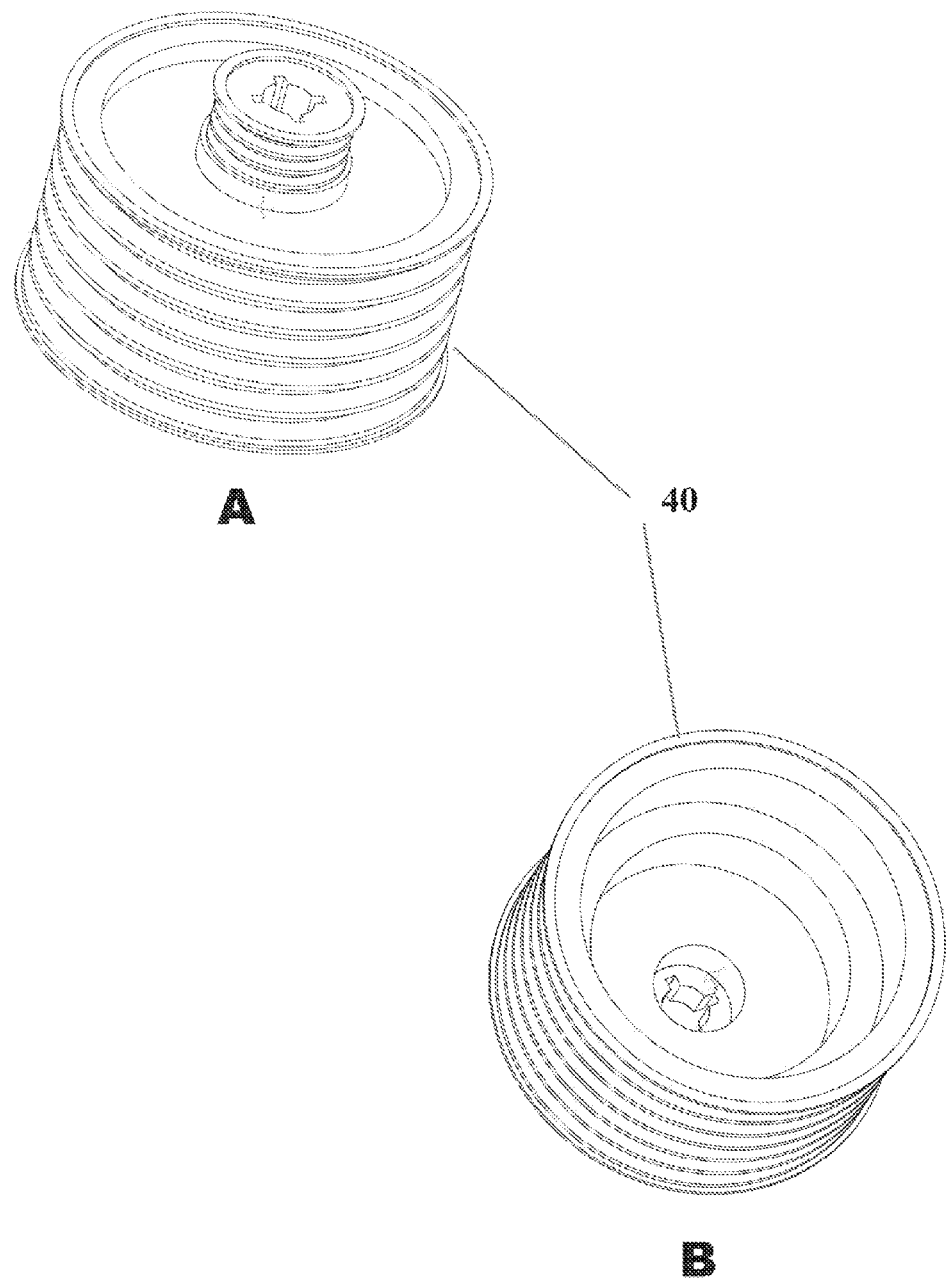
FIGS. 7A-7B are front and rear perspective views of a pulley used in the construction of the engine depicted in FIGS. 1A-1B.
Figure 12:
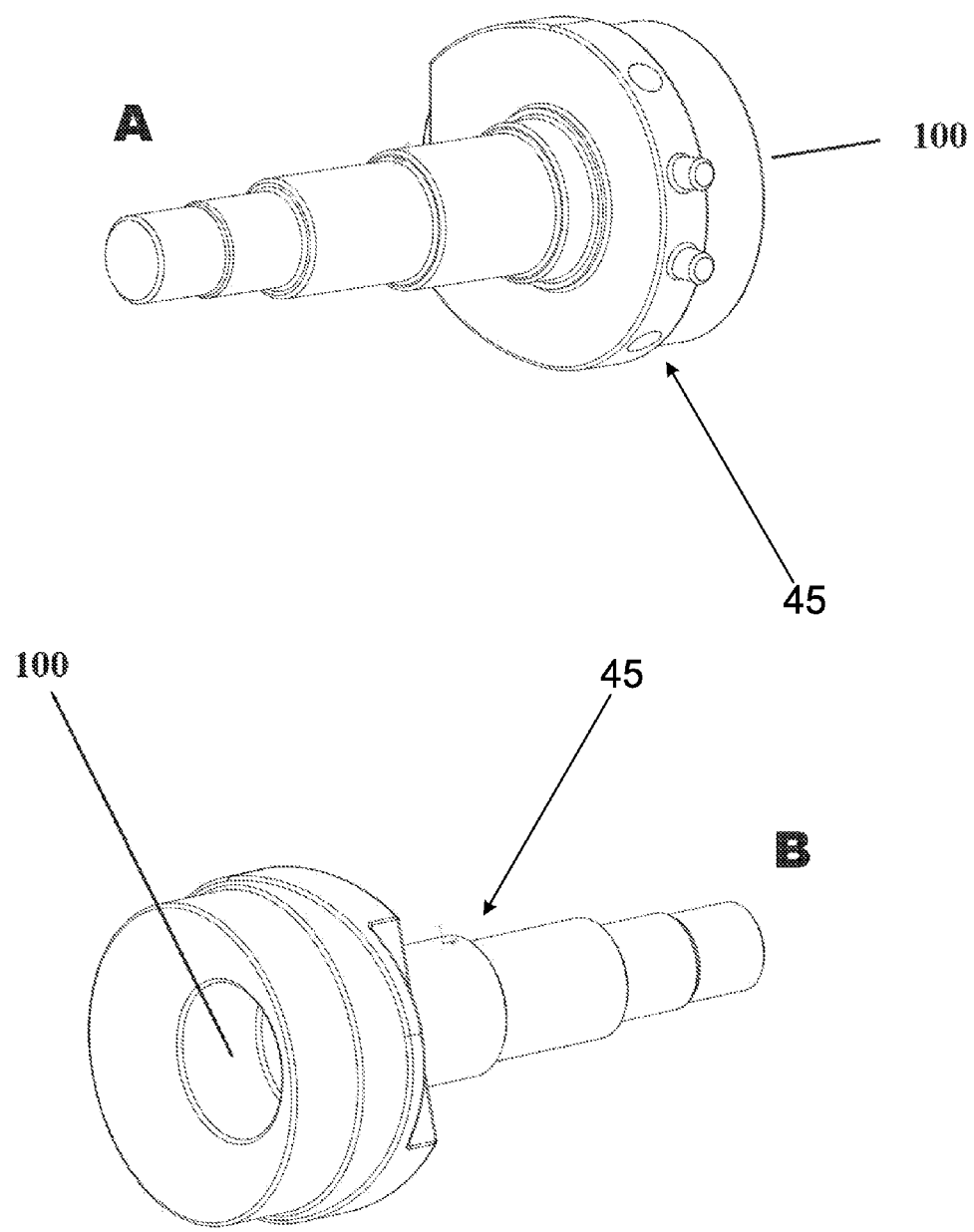
FIGS. 12A-12B are front and rear perspective views of the second crank shaft used in the internal combustion engine depicted in FIGS. 8A-8B.

Referring once again to FIG. 1B, the base plate 30 provides support for a pulley 40 (see FIGS. 7A-7B) that is coupled to and rotatable by a second crank shaft 45 (shown in FIGS. 12A-12B). The base plate 30 reduces the torsional and/or load applied to the second crank shaft 45 through a bearing assembly located adjacent to base plate 30. The pulley 40 through the use of at least one belt, preferably through the use of multiple belts, may be used as a means to drive or provide power to a variety of accessory equipment, including but not limited to, an air conditioning compressor, a supercharger, an alternator, or an injection pump.

Figure 8:
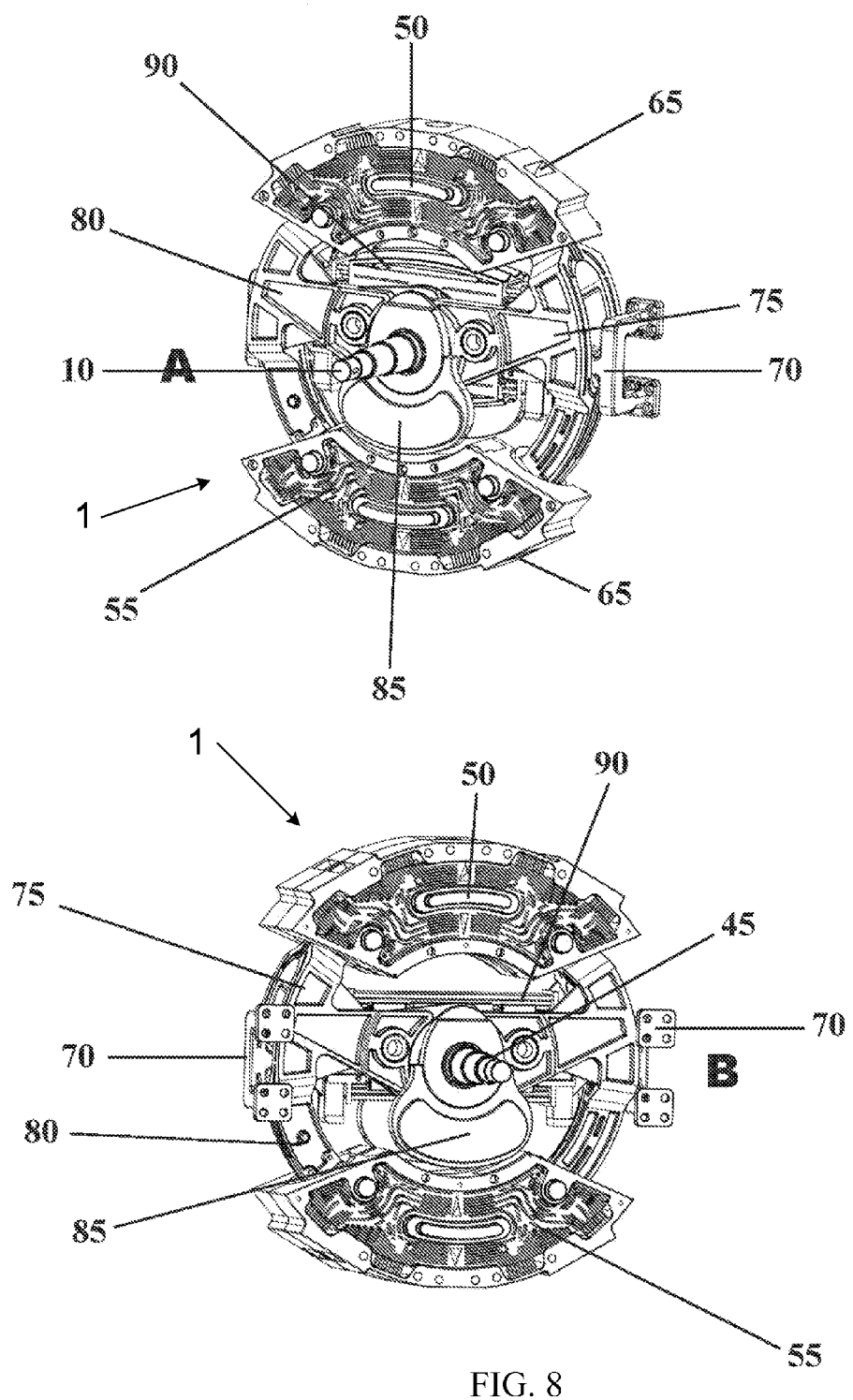
FIG. 8A is an anterior perspective view of certain portions of the internal combustion engine depicted in FIGS. 1A-1B.
FIG. 8B is a posterior perspective view of certain portions of the internal combustion engine depicted in FIGS. 1A-1B.

Referring now to FIGS. 8A-8B, between the top plate 15 and the base plate 30, the engine assembly 1 includes two piston combustion chambers or cylinder liners, namely, an upper cylinder liner 50 and a lower cylinder liner 55. The upper 50 and lower 55 cylinder liners are similar in design to one another in that each one includes a front half 52 (shown in FIGS. 9A-9B) and a back half 54 (shown in FIGS. 10A-10B) that may be coupled together. Such coupling may be accomplished by any means known to one skilled in the art of engines, including but not limited to the use of bolts and adhesives. The use of gaskets and seals may be used to reduce the possible occurrence of any leaks that could develop between the fastened halves of the cylinder liners 50, 55.

Each of the upper and lower cylinder liners 50, 55 includes an internal cavity having a wall 57 that delimits a combustion chamber and defines at least a section of a torus. The wall 57 as an inner race 58 and an outer race 59 that further defines the combustion chamber and the torus geometry. More specifically, the wall 57 in the upper cylinder liner 50 delimits a first combustion chamber, while the wall 57 in the lower cylinder liner 55 delimits a second combustion chamber. It is understood that, within the scope of this disclosure, a torus means ring-shaped defined by a piston head oscillating around a common pivot point. Although the cross-sectional shape of the piston heads and the internal cavity of the cylinder liners are shown throughout this disclosure to be circular, it is possible that they may be another shape, such as but not limited to, a square, rectangle, or ellipse.

Figure 9:
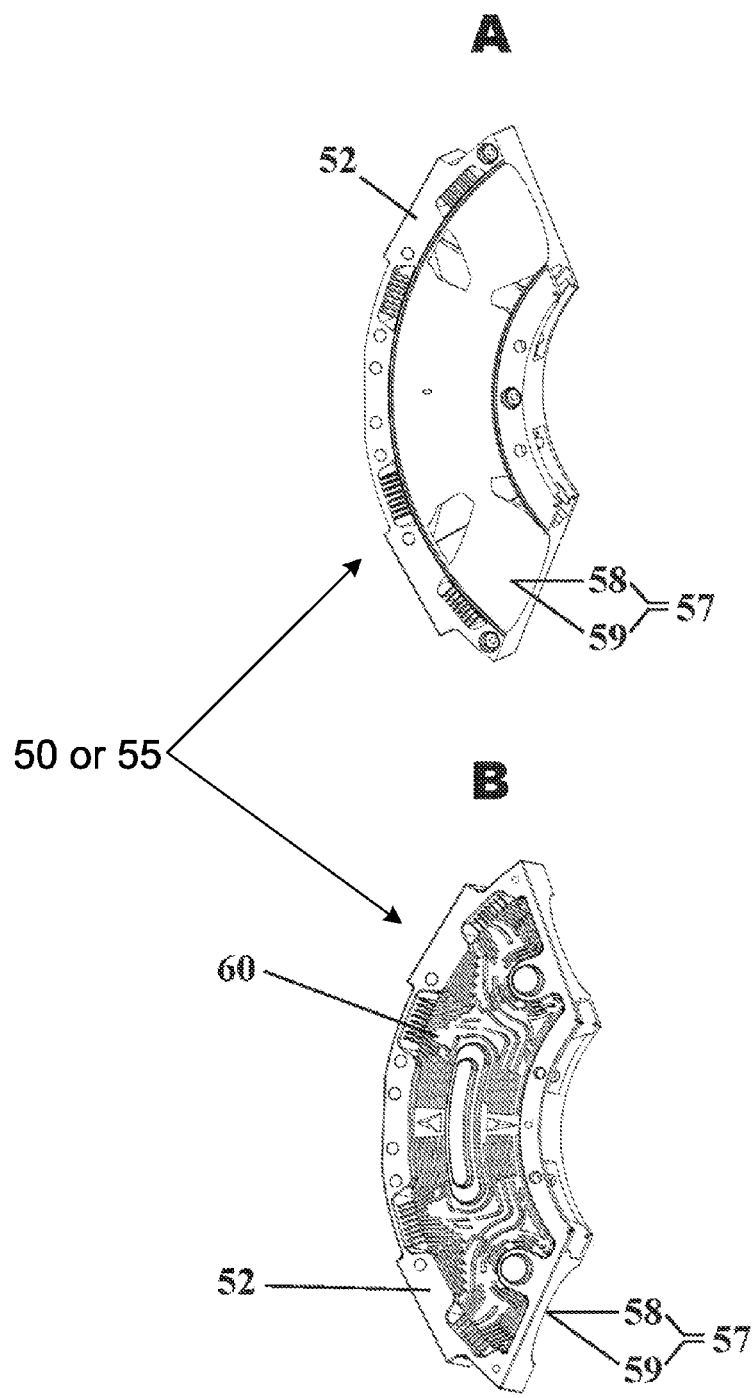
FIGS. 9A-9B are front and rear perspective views of the front half of the upper or lower cylinder liner used in the internal combustion engine depicted in FIGS. 8A-8B.
Figure 10:
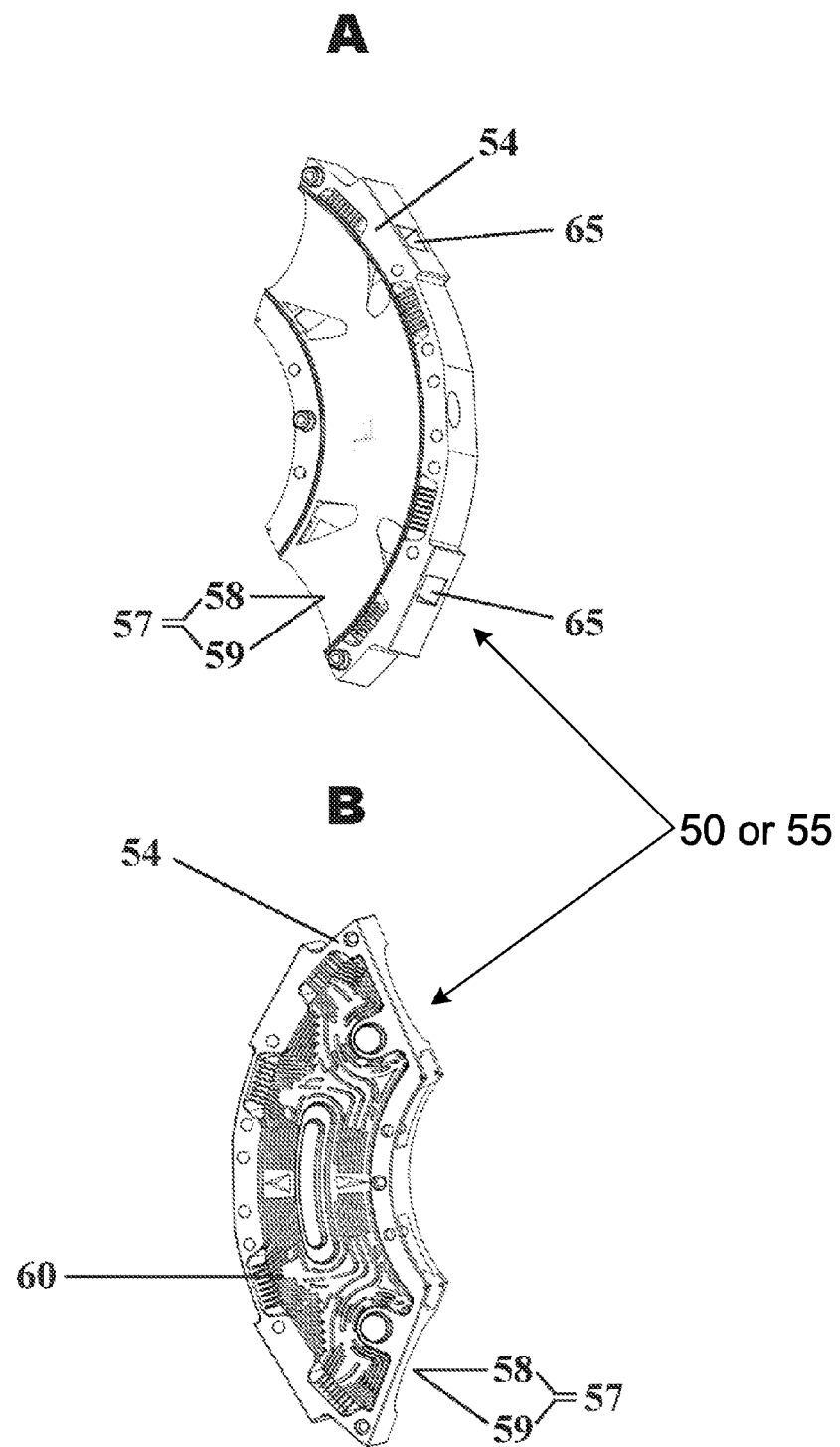
FIGS. 10A-10B are front and rear perspective views of the back half of the upper or lower cylinder liner used in the internal combustion engine depicted in FIGS. 8A-8B.

Still referring to FIGS. 9B and 10A, the outer surface of at least one cylinder liner 50, 55 may contain multiple grooves 60 in order to reduce weight and to provide greater a surface area for cooling by the air that is forced to flow across the grooves 60 as the air flows through the engine assembly 1 (see FIGS. 5A-5B). Optionally, cylinder liners 50, 55 may further comprise cooling channels (not shown). These cooling channels may utilize the flow of a gas, such as air, or the flow of a liquid, such as water or oil, to provide an additional cooling effect to the combustion chambers 50, 55 and piston heads.

Each cylinder liner 50, 55 include at least one inlet port and one exhaust port. Preferably, each cylinder liner 50, 55 having front 52 and back 54 halves includes a total of four ports 65, wherein two of the ports are used for inlet air and two of them for exhaust air during operation. Each cylinder half 52, 54 may include two of the ports 65 (see FIGS. 8A and 10B). One skilled-in-the-art will understand that one of the inlet and one of the exhaust ports 65 may not be necessary and is incorporated to reduce cost and simplify the manufacturing process. However, when present one of the inlet ports 65 and one of the exhaust ports 65 will become obstructed or closed off by a cylinder cap during the assembly of the engine 1. The ports 65 are arranged such that the air enters and exits the torus shaped combustion chamber around a substantial portion of the circumference of the chamber. This type of air enter/exit process may be called "cross flow scavenging" and is capable of achieving a combustion efficiency of greater than or equal to 93 percent. Preferably, the air enters and exits the torus shaped combustion chamber through inlet ports 65 located on the inner race 58 and outer race 59, respectively, of the wall 57 defining the inner cavity in the lower and upper liners 50, 55.

In addition to an inlet and exhaust port, at least one of the cylinder liners 50, 55 may also include a cylinder pressure mount and a spark or glow plug in case of diesel fuel. A double spark ignition system may be provided. In addition, a fuel injector port 77 may be provided that intersects with a combustion chamber in each of the cylinder liners 50, 55. (see FIGS. 5A-5B) The angle of intersection between the inlet port, exhaust port, and injector port with the internal surface of a combustion chamber is preferably within the range of about 30-90 degrees. During the normal scavenging process, the exhaust port will be preferably opened for a longer period of time than the inlet port.

The fuel injector may utilize a nozzle having a linear spray pattern divided into multiple planes. Each plane can have up to ten injector hole openings that allow fuel to enter the combustion chamber in an arc relative to the central axis of the injector's nozzle. The spray pattern may be parallel to the middle plane (as indicated by the dashed lines of FIG. 5) of the entire engine assembly 1 or parallel to the surfaces of the piston heads 180 that delimit the combustion chamber when they are in a top dead center position (as shown by the dotted pattern in FIG. 5 parallel to the piston head surface when in the top dead center position). The type of spray pattern allows the fuel to mix more effectively with the compressed gases and eliminates any unwanted overspray of the fuel onto the walls of the torus combustion chamber upon which the piston heads 180 travel during the oscillating motion from the top dead center position to a bottom dead center position back to the top dead center position.

Figure 11:
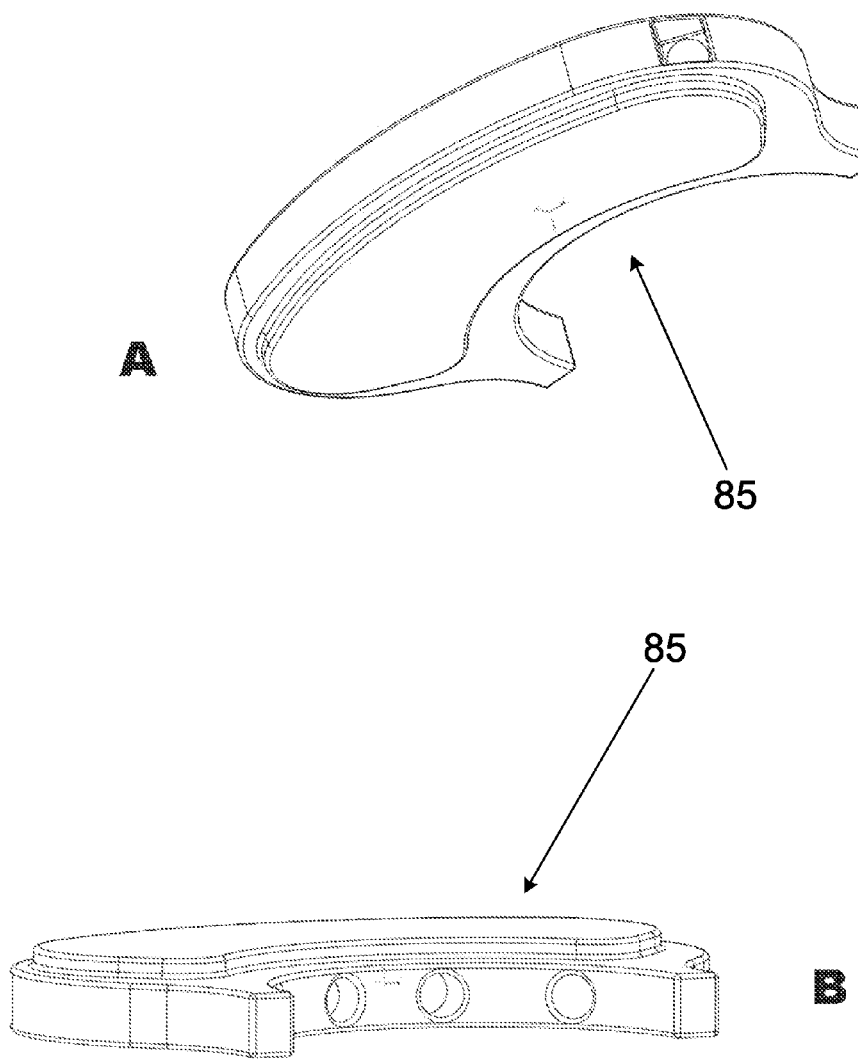
FIGS. 11A-11B are front and rear perspective views of a counter weight used in the internal combustion engine depicted in FIGS. 8A-8B.

Still referring to FIGS. 8A-8B, other components within the engine assembly 1 include a rail 70, first primary members 75, second primary members 80, a counter weight 85 (see FIGS. 11A-11B), and a halter sub-assembly, which includes the halter 90. Additional components in the engine assembly 1 include an intermediate sub-assembly, and at least one slider assembly. The components are designed such that the radial motion in the engine assembly 1 is aligned in accordance with the central axis of the first 10 or second 45 crank shafts. The first 10 and second 45 crank shafts may be described as a two-piece crank shaft when the central axis of the first crank shaft 10 is aligned with the central axis of the second crank shaft 45. The only axial motion that occurs is related to the movement of the first 75 and second 80 primary members and the crank cups bearings.

Figure 13:
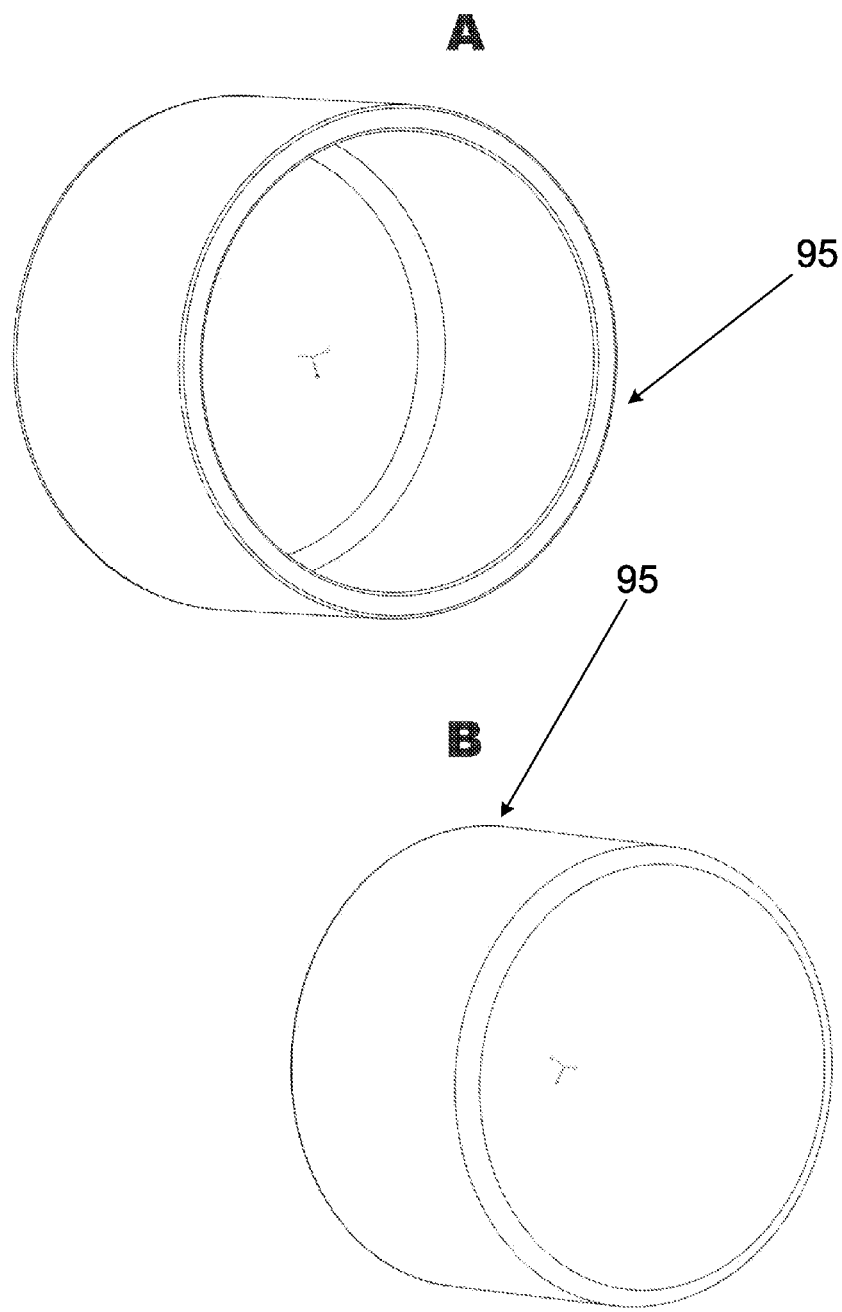
FIGS. 13A-13B are front and rear perspective views of a crank cup bearing used in the internal combustion engine depicted in FIGS. 8A-8B.

During the assembly of the engine 1, the second crank shaft 45 (see FIGS. 12A-12B) may be inserted through the central opening 91 in the base plate 30 (see FIGS. 6A-68) to provide support for the crank shaft 45 and pulley 40. The base plate 30 is designed to include features that assist in the alignment of the cylinder liners 50, 55, the crank shaft bearings, and the slider rail. A first crank cup bearing 95 (see FIGS. 13A-138) can be inserted into the non-axially aligned opening 100 on the second crank shaft 45, in which position it can act not only as a bearing, but also as a pin.

Figure 14:
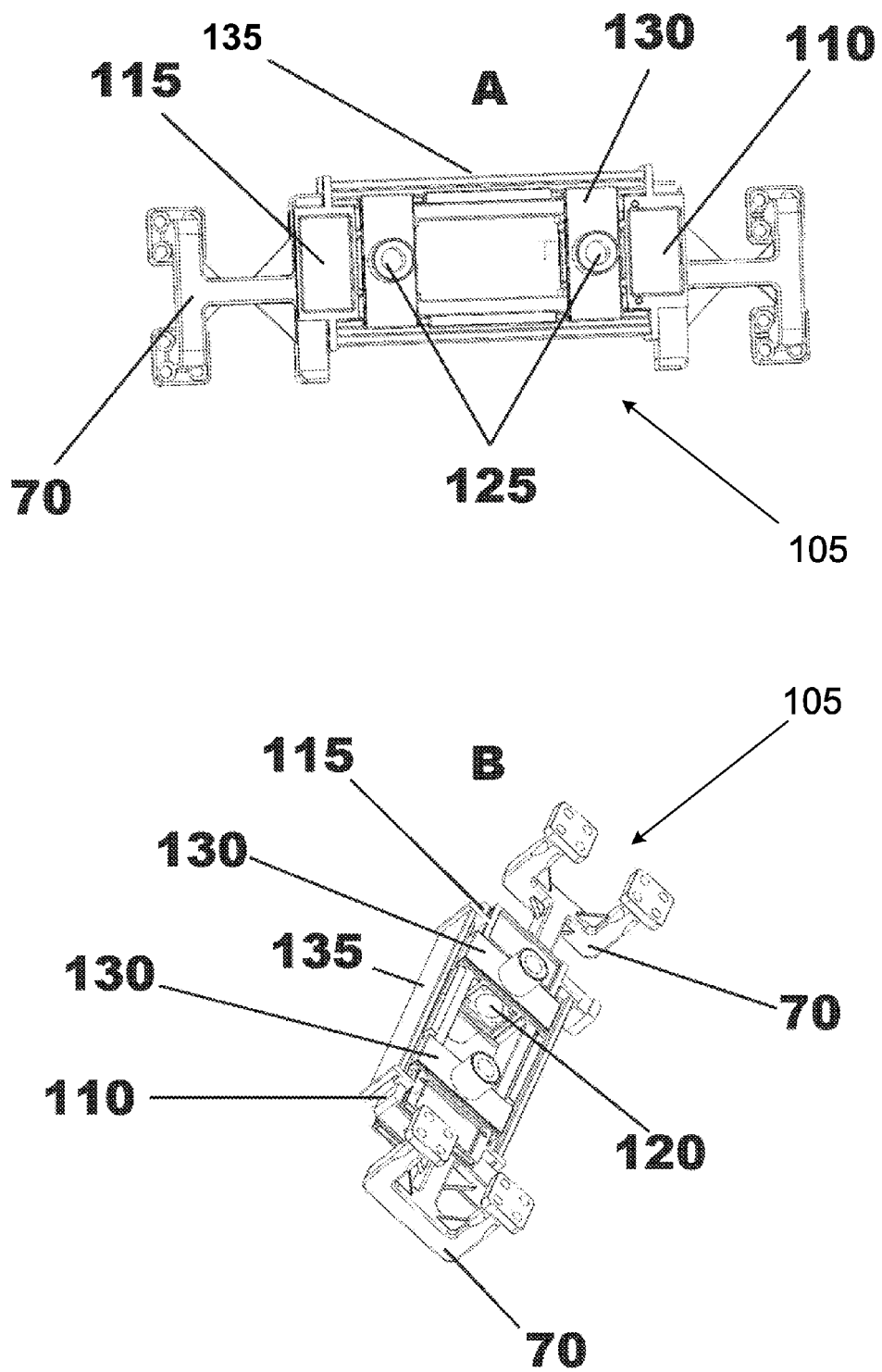
FIGS. 14A-14B are front and rear perspective views of the intermediate sub-assembly used in the internal combustion engine depicted in FIGS. 8A-8B.
Figure 15:
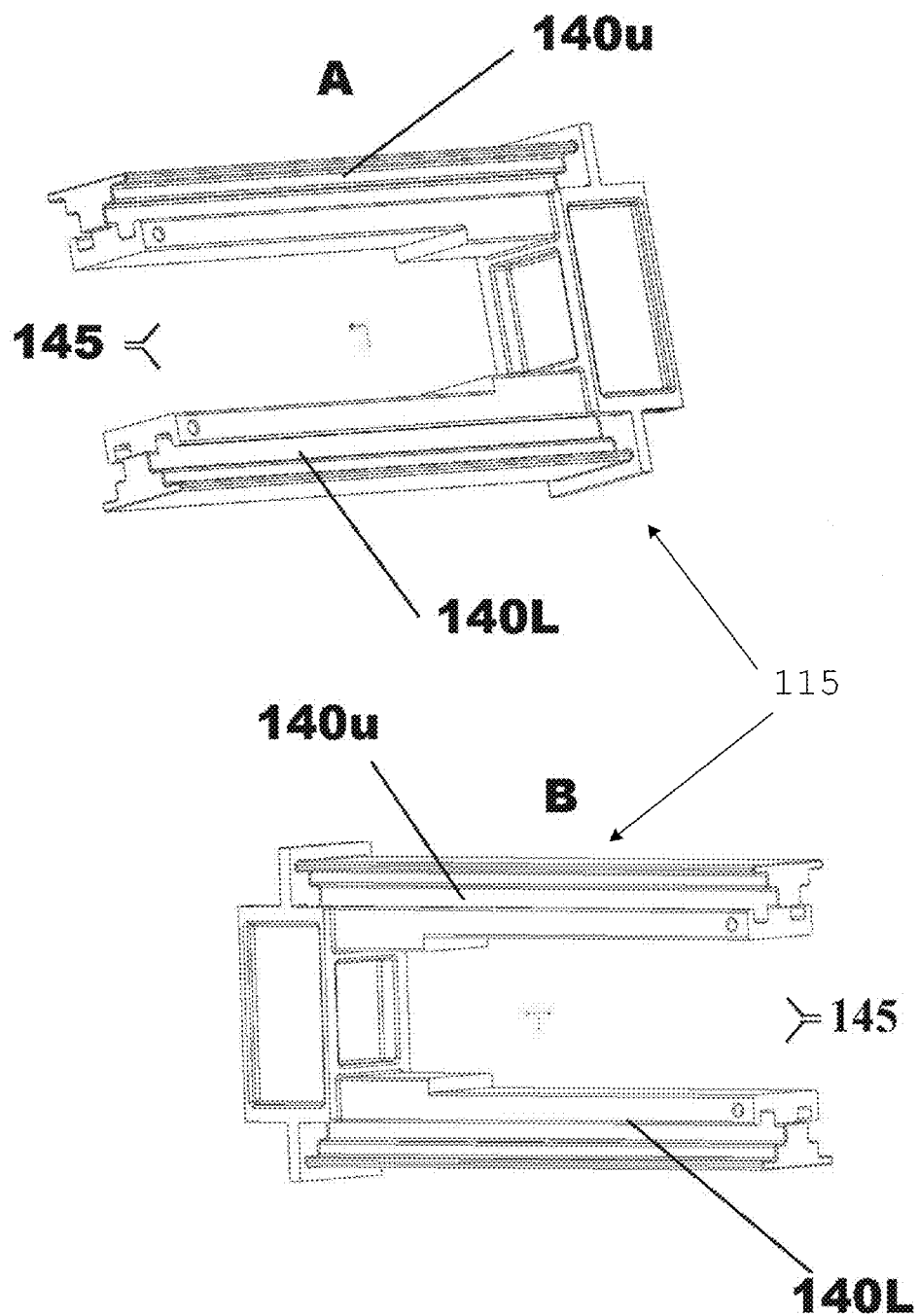
FIGS. 15A-15B are front and rear perspective views of the first intermediate member used in the intermediate sub-assembly of FIGS. 14A-14B.
Figure 16:
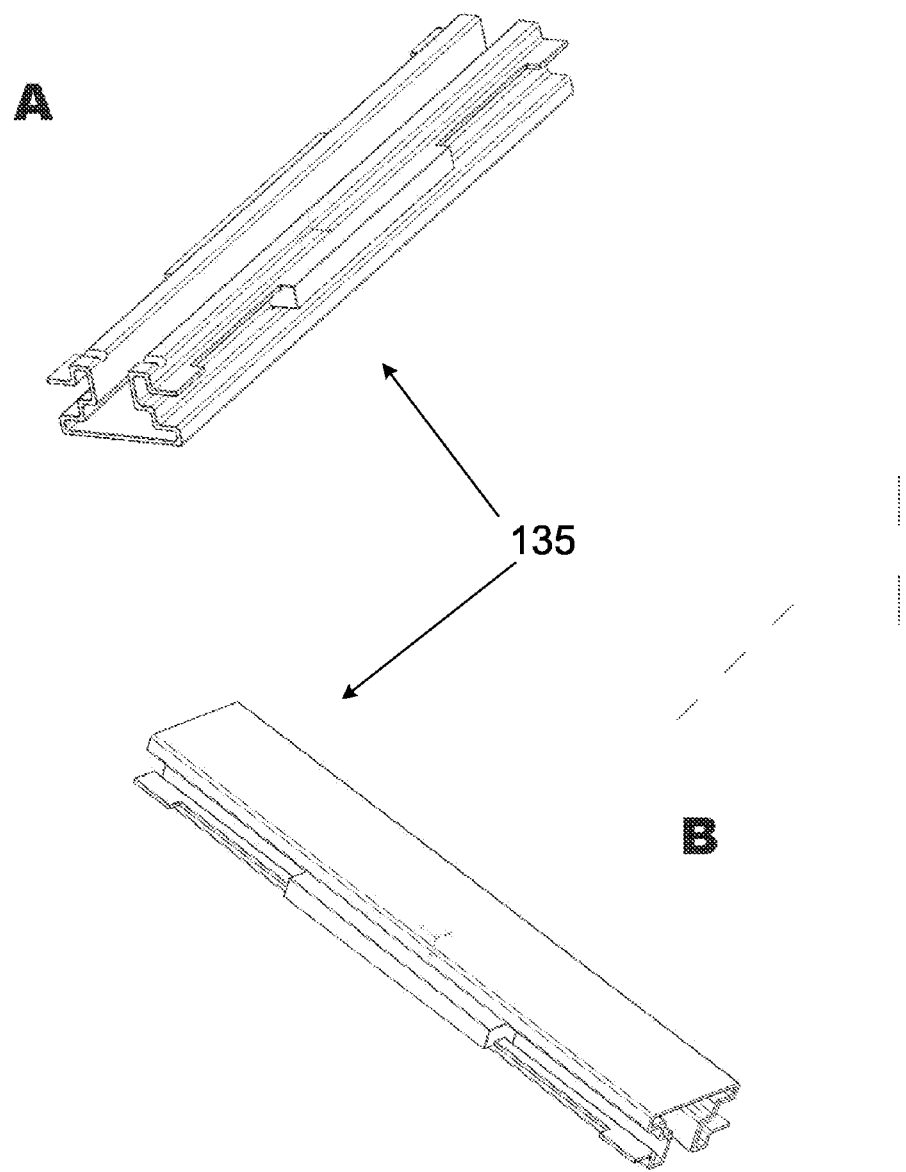
FIGS. 16A-16B are front and rear perspective views of the T-member used in the intermediate sub-assembly of FIGS. 14A-14B.
Figure 17:
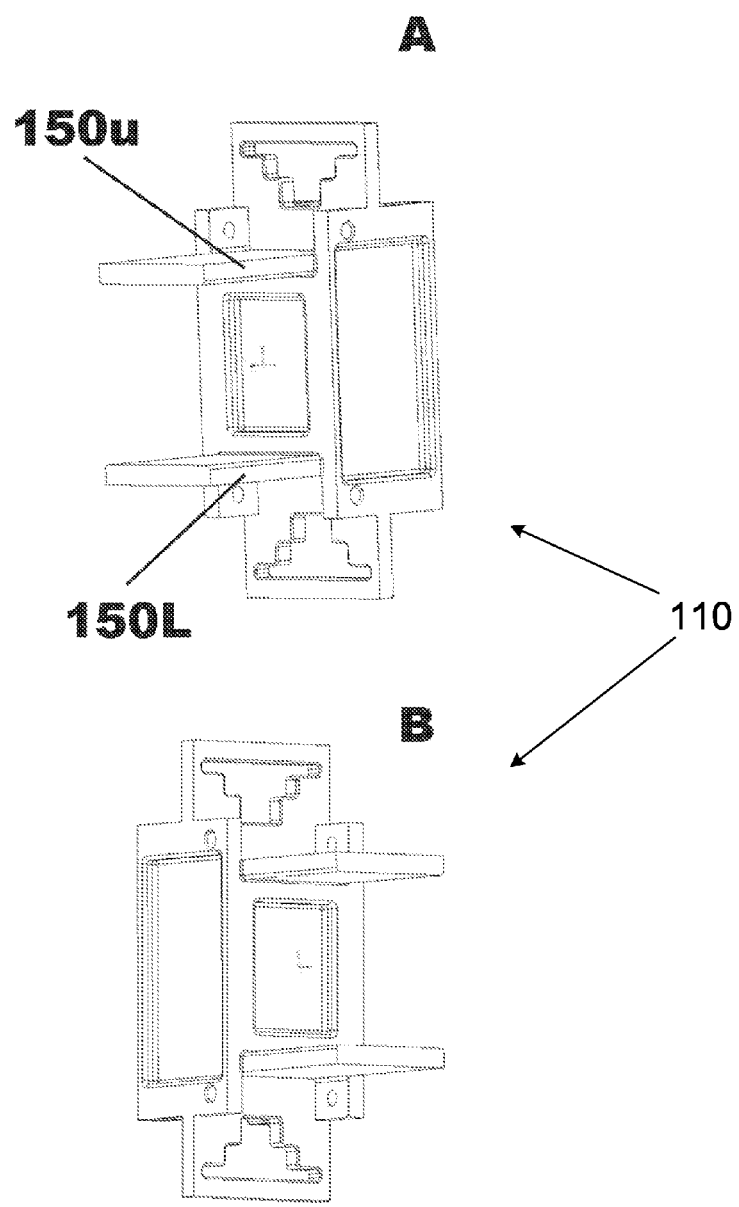
FIGS. 17A-17B are front and rear perspective views of the second intermediate member used in the intermediate sub-assembly of FIGS. 14A-14B.

Referring to FIG. 14A-14B, the intermediate sub-assembly 105 includes multiple components, such as a first intermediate member 115, a second intermediate member 110, and a halter (not shown), as well as at least one slider sub-assembly, which comprises multiple primary sliders 120, slider cups, slider covers 130, and rails 70. The intermediate sub-assembly 105 is in contact with the first 75 and second 80 primary members. The intermediate sub-assembly 105 utilizes a sliding mechanism to facilitate the movement of the first and second primary members 75, 80 in opposite directions along a predetermined toroidal path The first intermediate member 115 (see FIGS. 15A-15B) include multiple T-members 135 (see FIGS. 16A-16B) positioned on both its lower and upper extensions 140L, 140U. These T-members 135 will allow the sliders 120 and ultimately the halter 90 to slide upon them, as well as provide stability to the sliding mechanism due to the interlocking features between the T-members 135 and the first intermediate member 115. The open end 145 is designed such that the upper and lower extensions 140 of the first intermediate member 115 will couple and mate with the upper and lower extensions 150U, 150L of the second intermediate member 110 (see FIGS. 17A-17B). Separation of the first intermediate member 115 and second intermediate member 110 during the operation of the engine assembly 1 may be prevented by the use of at least one pin (not shown) press fit into a hole in each of the intermediate members 110, 115 that aligns itself during assembly.

Figure 18:
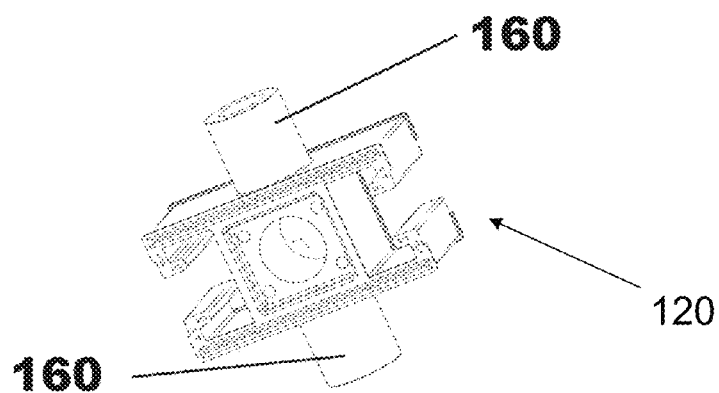
FIG. 18 is a perspective view of a primary slider used in the internal combustion engine depicted in FIGS. 8A-8B.
Figure 20:
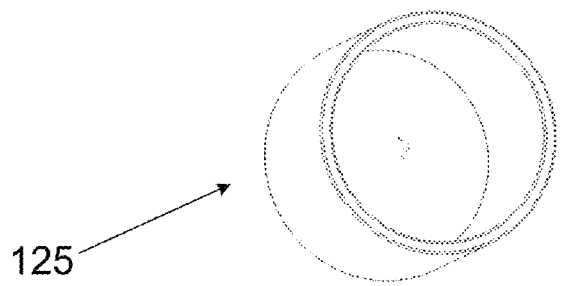
FIG. 20 is a perspective view of a slider cup used in the internal combustion engine depicted in FIGS. 8A-8B.
Figure 19:
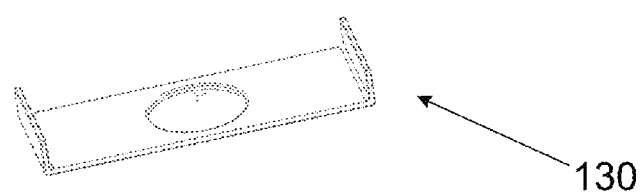
FIG. 19 is a perspective view of a slider cover used in the internal combustion engine depicted in FIGS. 8A-8B.

The slider sub-assembly includes multiple primary sliders 120 (see FIG. 18) with the peripheral surface of each being in contact with a slider cover 130 (see FIG. 19). A slider cup 125 (see FIG. 20) is inserted on to the rod-like provisions 160 located on the sides of each slider 120. The slider cup 125 also makes contact with the slider cover 130. The slider sub-assembly may also include a side wall and/or a top or lid as part of the overall structure. The side wall and the top/lid may act as frictional planar bearings. Preferably, the slider components are made of graphite or similar material, thereby, enabling the slider sub-assembly to move within the intermediate sub-assembly 105 with a low level of friction.

Figure 21:
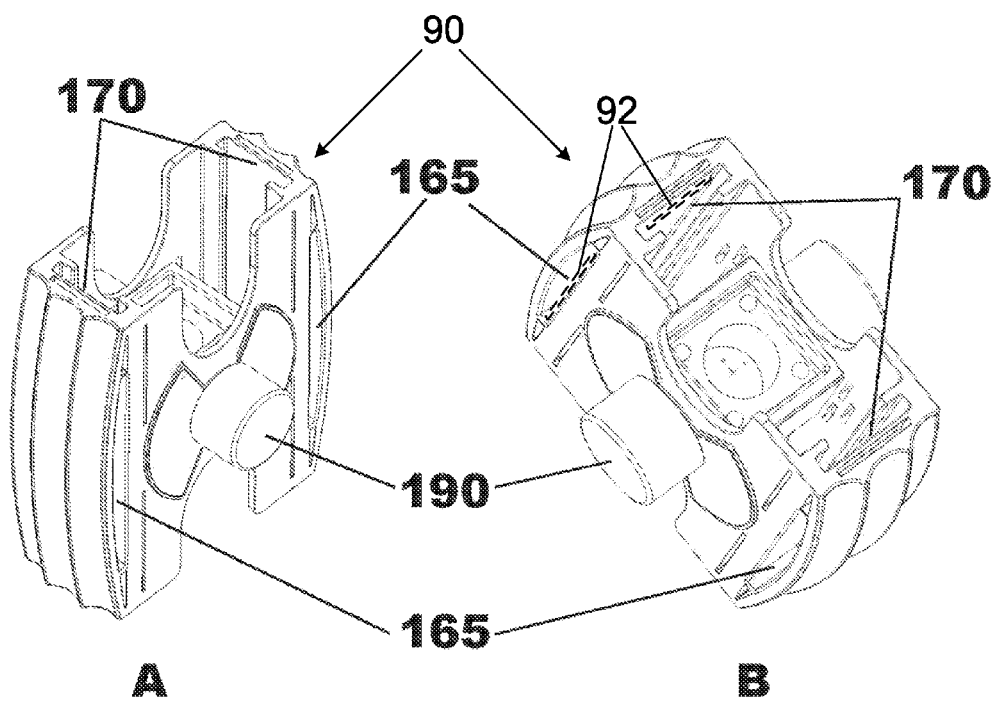
FIGS. 21A-21B are front and rear perspective views of halter used in the halter sub-assembly in the internal combustion engine depicted in FIGS. 8A-8B.

The halter sub-assembly is comprised of the halter 90 (see FIGS. 21A-21B) and multiple planar bearings with examples shown at 92. The planar bearings are preferably made of graphite or a similar low friction material. At least one of the planar bearings, which will act as a horizontal frictional bearing, is inserted into the horizontal provisions 165 inside the halter 90. Similarly, at least one of the planar bearings may be inserted on the vertical peripheral provisions 170 of the halter 90.

Two slider sub-assemblies are used in conjunction with the intermediate sub-assembly 105. More specifically, as shown in FIGS. 14A-14B, the slider assemblies contact the T-member 135 near the peripheral edge of the intermediate sub-assembly 105. Thus the intermediate sub-assembly includes a slider 120 on each side of the halter 90.

Figure 22:
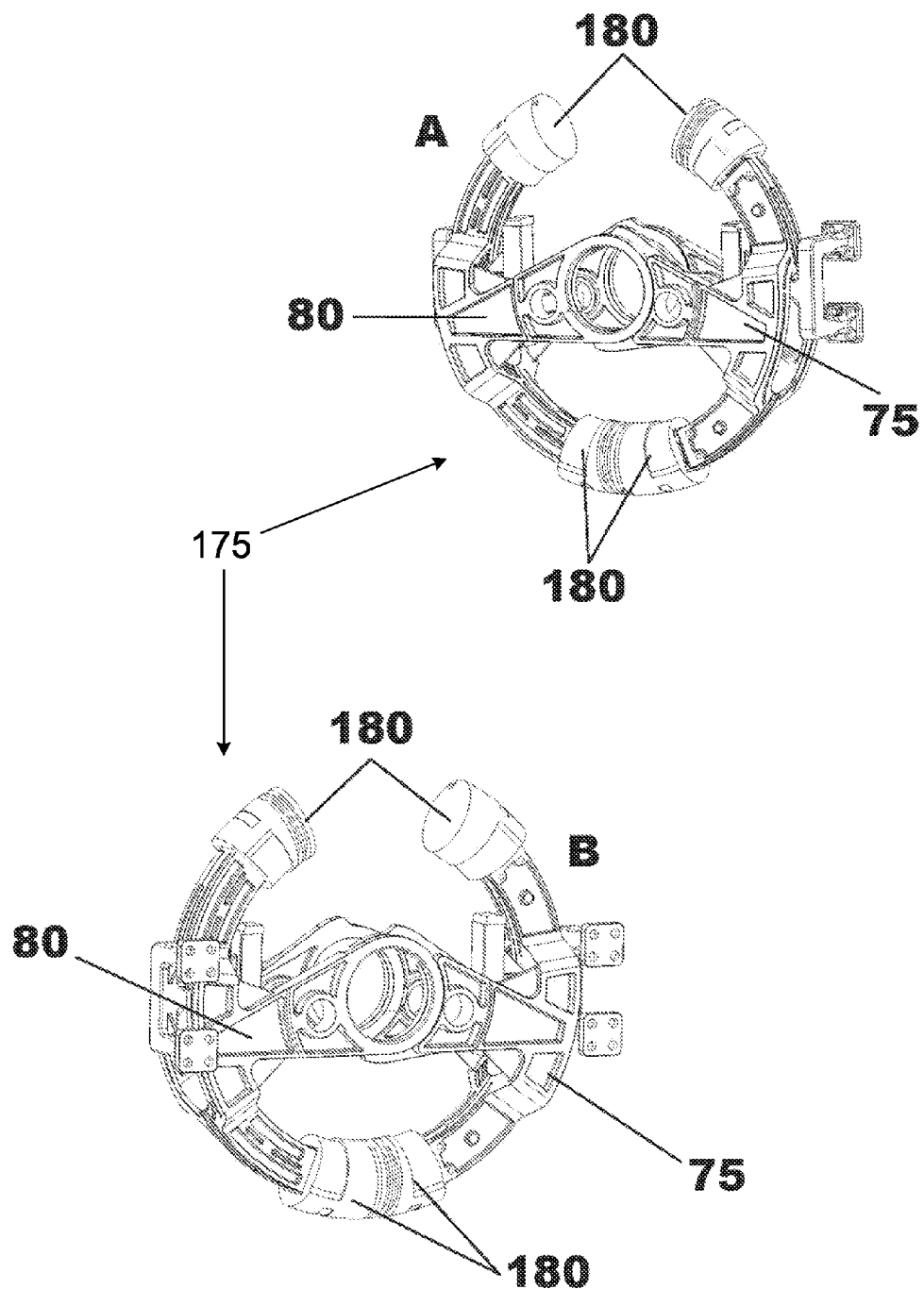
FIGS. 22A-22B are perspective views illustrating the piston sub-assembly used in the internal combustion engine of FIGS. 1A-1B with the pistons rotated in their lower position.
Figure 23:
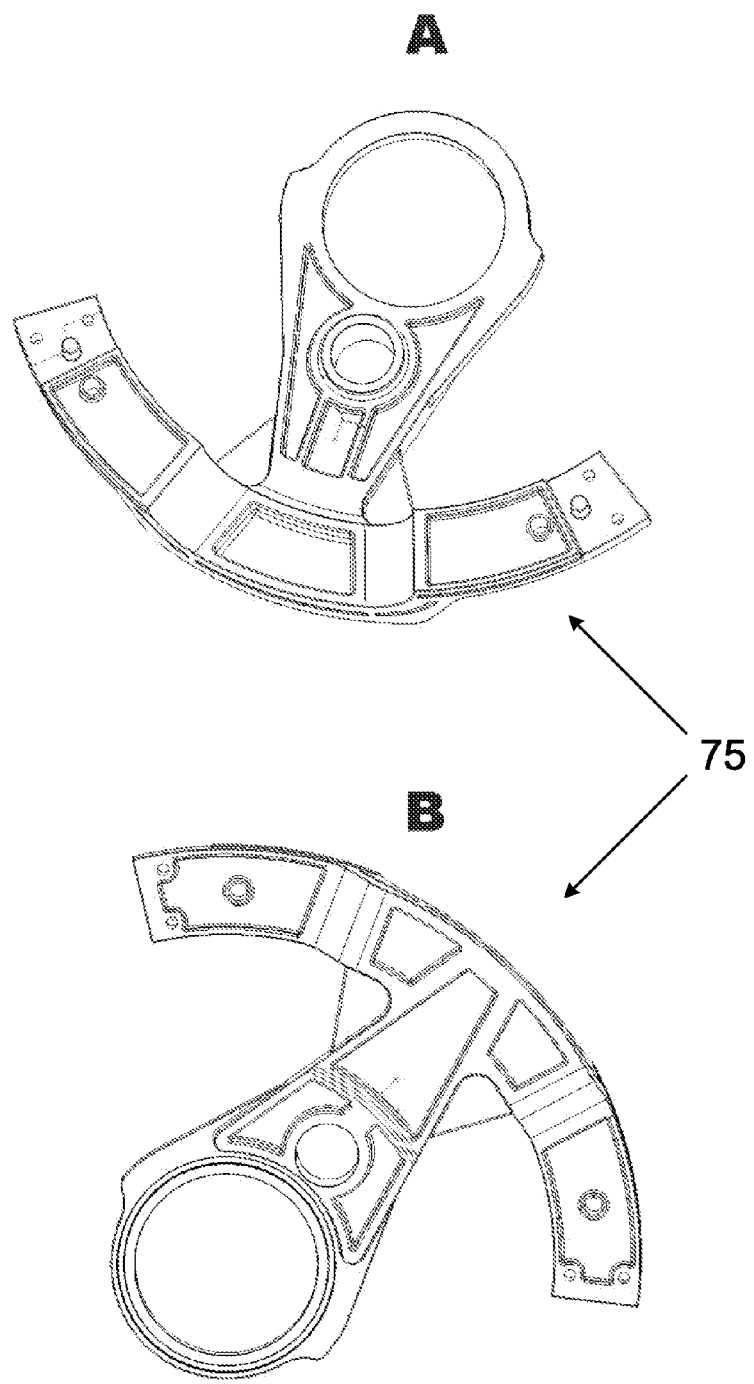
FIGS. 23A-23B are front and rear perspective views of the first primary member used in the piston sub-assembly of FIGS. 22A-22B.
Figure 24:
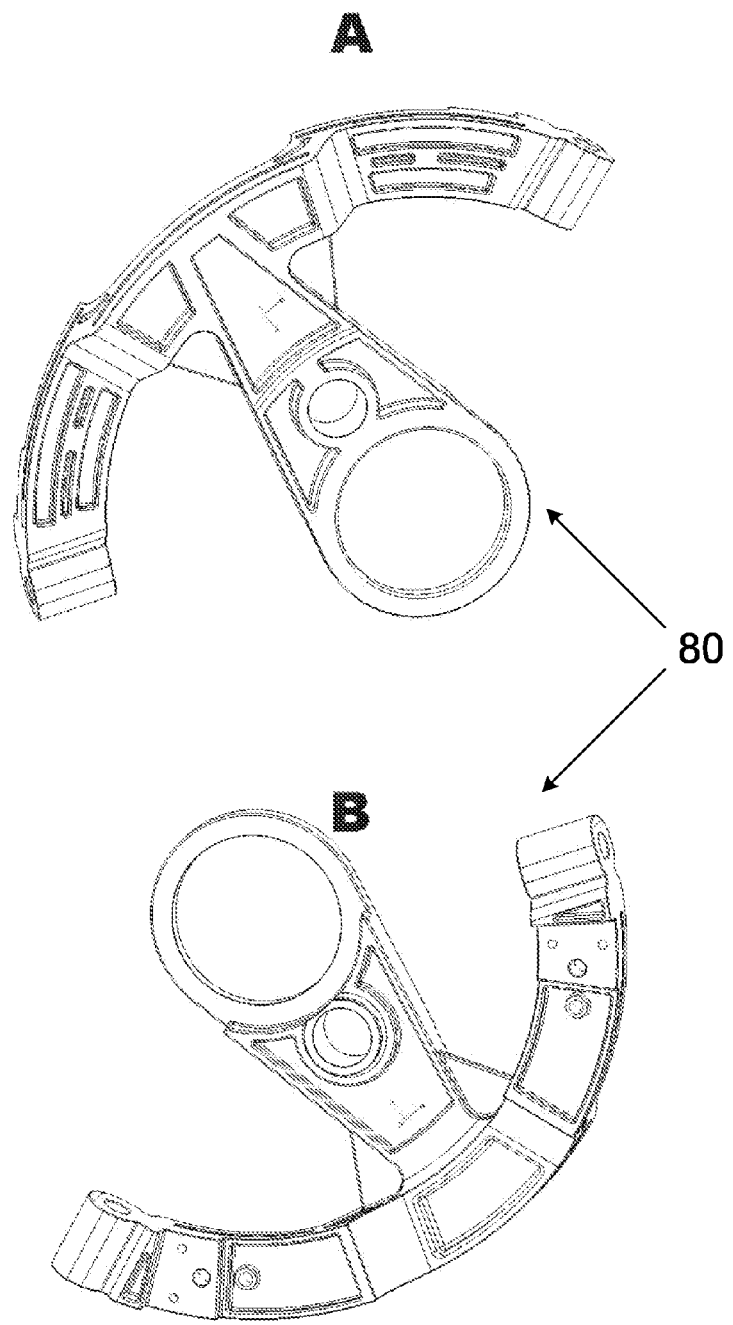
FIGS. 24A-24B are front and rear perspective views of the second primary member used in the piston sub-assembly of FIGS. 22A-22B.
Figure 25:
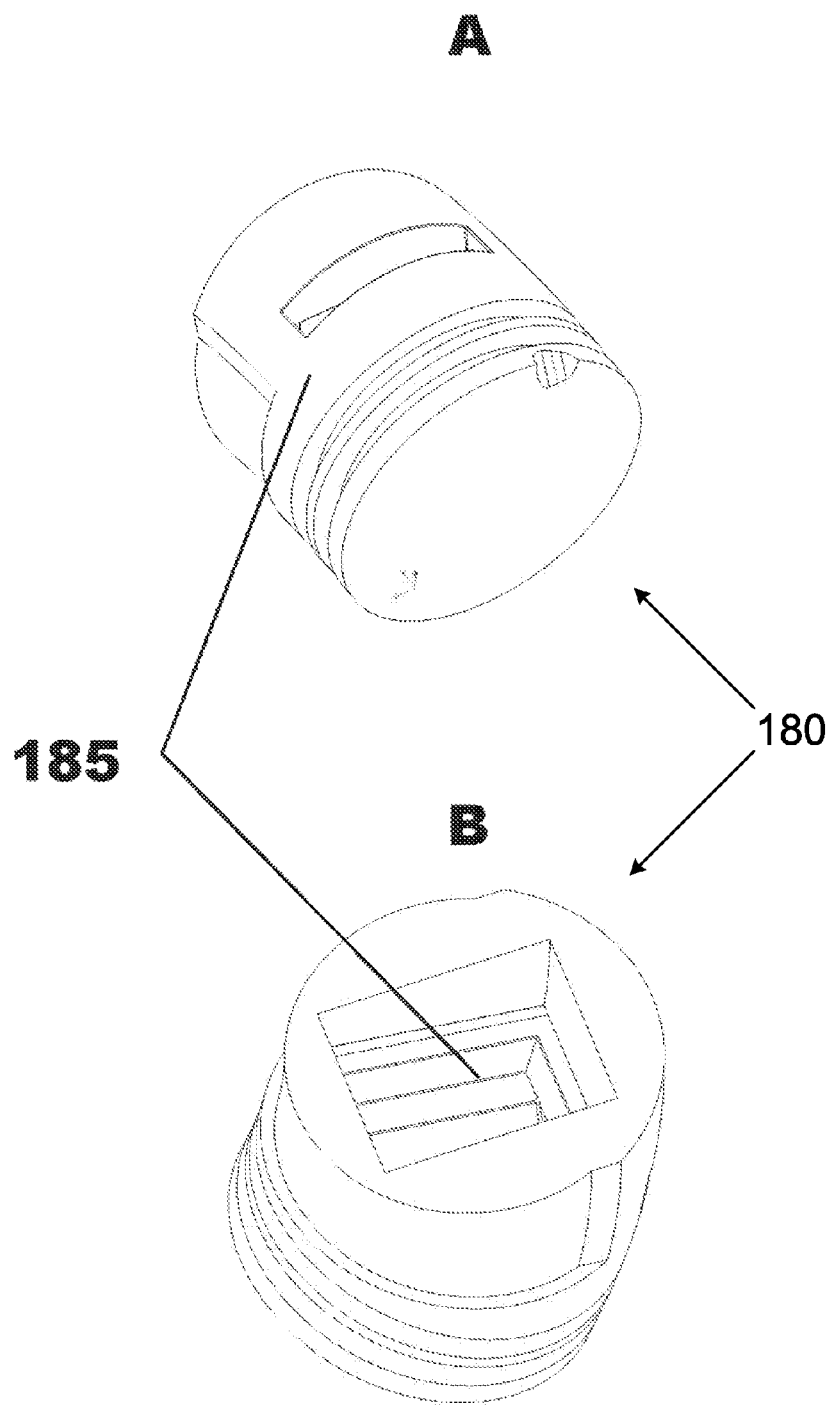
FIGS. 25A-25B are front and rear perspective views of the piston heads used in the piston sub-assembly of FIGS. 22A-22B.

Referring now to FIGS. 22A-22B, the engine assembly 1 further comprises a piston sub-assembly 175 whose movement is assisted by the intermediate sub-assembly 105 along with the sliders 120 and halter 90. The piston sub-assembly 175 includes the first primary member 75 (see FIGS. 23A-23B), the second primary member 80 (see FIGS. 24A-24B), and multiple piston heads 180 (see FIGS. 25A-25B). Each of the primary members 75, 80 includes two piston heads 180 positioned at opposite ends of the member. The piston heads are fastened to each primary member 75, 80 by means of a retaining component, such as a piston plate (not shown). The retaining component is inserted into the slot 185 located along the radial arc of the piston head 180. The retaining component is prevented from moving during the operation of the engine assembly 1 by the placement of a low friction cover (not shown) over the slot that is preferably made of a similar material as the piston head 180. The surface of the cover preferably coincides with the surface of the piston head 180 in order not to obstruct the movement of the piston heads 180 when positioned inside the piston cylinder liners 50, 55.

The piston heads 180 positioned on either a first 75 or second 80 primary members may also delimit the internal cavity of the cylinder liners 50, 55. Each piston head 180 may have a torus shape. The internal surface of the walls 57 within the cylinder liners 50, 55 may further act as guides for the piston heads 180 located at the ends of the primary members 75, 80.

The engine assembly 1 may also include the use of various radial friction bearings located between the crank shafts 10, 45 and the primary members 75, 80, or planar friction bearings located between the primary members 75, 80, and/or between the intermediate members 110, 115 and rails 70. The crank shafts 10, 45 are arranged such that they are positioned inside the diameter of the piston heads 180 and primary members 75, 80 toroidal path (see FIGS. 5A-5B).

Figure 26:
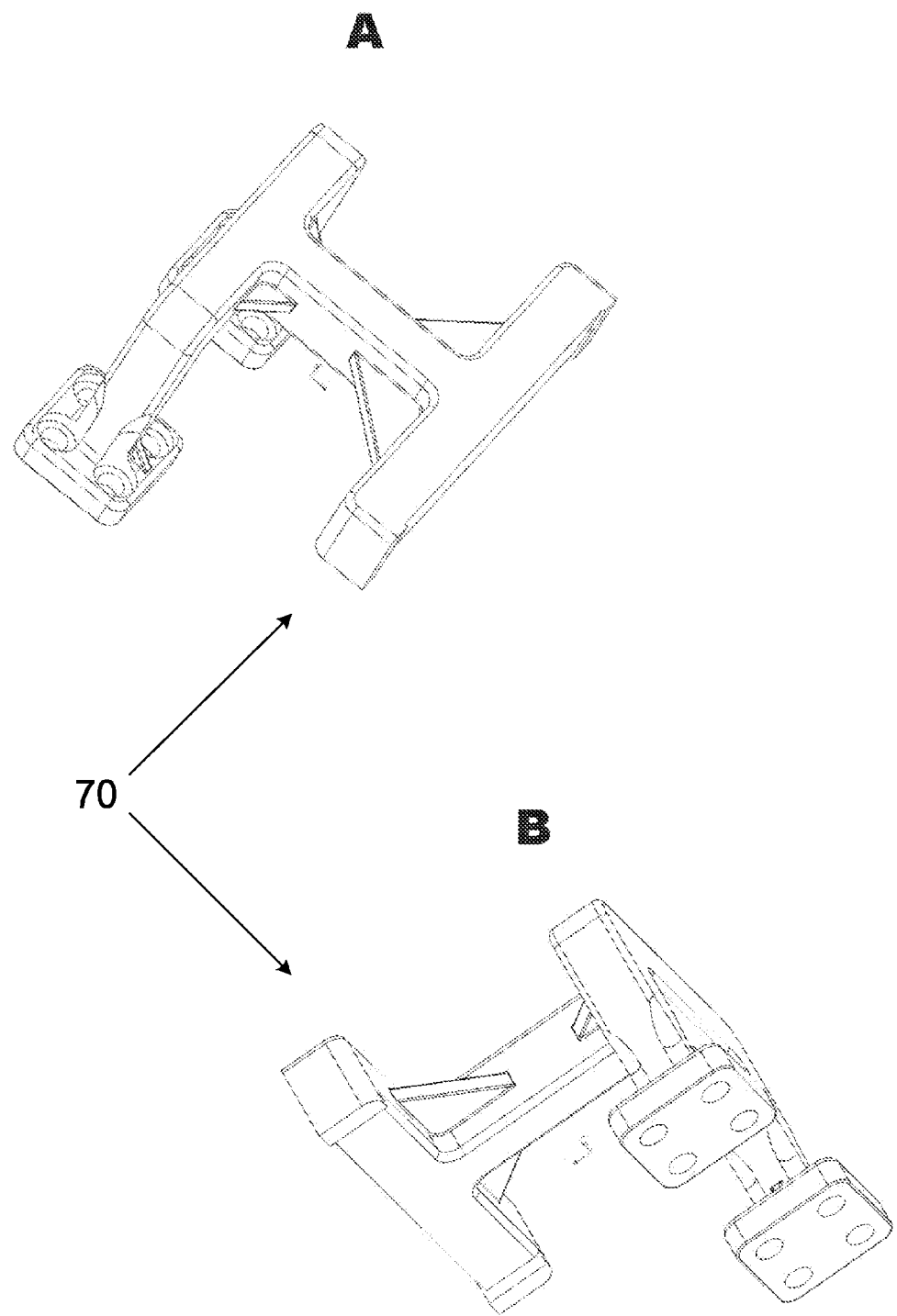
FIGS. 26A-26B are perspective views of a rail used in the internal combustion engine depicted in FIGS. 8A-8B.

The rails 70 (see FIGS. 26A-26B) are designed such that they are capable of mating with the internal surface base plate 30. In addition, the halter 90 is designed to interact with and mate with the crank shafts 10, 45, the sliders 120 and/or slider cups 125. The crank shafts 10, 45 along with the crank cup bearings 95 interact with the crank rods 190 located on the halter 90 (see FIGS. 21A-21B).

The engine assembly 1 may further comprise any number of side plates 195 as shown in FIGS. 1A-1B with each side plate providing for structural support for the engine assembly. These side plates 195 may also act as the surface upon which the engine assembly 1 may be mounted to a structure (not shown) for use in a specific application. During the assembly of the engine 1, the alignment of the cylinder liners 50, 55 with the piston heads 180 and the crank shafts 10, 45 through the top 15 and base 30 plates is accomplished. The entire engine assembly 1 may be securely held together through the use of more than one push bolt or other similar means that go through the top plate 15 and are threaded or fastened to the base plate 30.

The first primary member 75, the second primary member 80, the piston heads 180, the first cylinder liner 50, and/or the second cylinder liner 55 may be comprised of a metal, a carbon composite, or a ceramic composite among others. The piston heads 180, as well as any bearing surfaces, including but not limited to the crank cup bearing 95, may be made of graphite composite in order to reduce friction resulting from contact with other components in the engine assembly 1. One benefit of using a ceramic composite, such as graphite, is that the need for the use of an oil or other external lubricant to reduce the amount of friction between moving parts or components in the engine assembly 1 is either reduced or eliminated entirely.

The primary members 75, 80 and piston heads 180 may be either completely solid or partially hollow depending upon the weight requirements for the intended application. Examples of metals may include but are not limited to aluminum and heat treated steel. Examples of ceramic composites may include silicon carbide or silicon nitride, among others. The strength of carbon and ceramic composites may be enhanced through the use of fiber reinforcement. Each of the various components within the engine assembly 1 may be made as a single component or in multiple pieces that are fastened together to make the component.

During operation of the engine assembly 1, when the primary sliders 120 are located at a point at which the sliders 120 are the farthest apart from one another with the assembly 1, the piston heads 180 are located in a middle position where the piston heads 180 in the lower and upper cylinder liners 50, 55 are separated from one another. As the primary sliders 120 are allowed to move towards one another, the piston heads 180 in one of the cylinder liners 50, 55 move closer together until heads in that cylinder line reaches the dead center position within the liner. When the piston heads 180 are in the dead center position, the halter 90 is also in a middle plane position with respect to the entire engine assembly 1.

The engine assembly 1 has multiple primary members 75, 80 with piston heads 180 that travel along a path of at least a partial torus. The motion of the primary members 75, 80 in the engine assembly 1 of the present disclosure may rotate into an upper position (not shown), whereby, the piston heads 180 in the upper cylinder liner 50 minimizes the volume of space located between these piston heads 180. At the same time, the volume of space between the piston heads 180 in the lower cylinder line 55 reaches its maximum. When the primary members 75, 80 are rotated into a middle position (shown in FIGS. 8A-8B) the volume of space between the piston heads 180 in the upper 50 and lower 55 cylinder liners will be similar. When the primary members 75, 80 are rotated into a lower position (shown in FIGS. 22A-22B), the volume of space between the piston heads 180 in the lower cylinder liner 55 is minimized, while the volume of space between the piston heads 180 in the upper cylinder liner 50 becomes maximized. The volume of space between the piston heads 180 in the cylinder liners 50, 55 may be referred to as the combustion chambers.

The engine assembly 1 may also incorporate the use of in-line valves, including but not limited to flapper valves, without exceeding the scope of the present disclosure. These in-line valves may be in the exhaust ducting 66 located proximate to the exhaust openings in the cylinder liners 50, 55 in order to prevent the back flow of air into the combustion chamber during the exhaust cycle.

According to one aspect of the present disclosure, the engine assembly 1 may be utilized as an efficient steam engine due to its small geometric footprint and opposing torus piston design and kinematic mechanism. When operated as a steam engine, only one or two inlet/exhaust ports 65 would preferably be present in the upper 50 and lower 55 cylinder liners with such ports 65 being positioned to intersect with the combustion chambers delimited by the piston heads 180. These ports 65 enable the steam to enter the combustion chambers and to press or force the piston heads 180 apart. For example, when the spatial area between the piston heads 180 in the upper cylinder liner 50 is minimized, steam is allowed to enter the combustion chamber, thereby, forcing the piston heads 180 apart. This action simultaneously causes the piston heads 180 in the lower cylinder liner 55 to move closer together in order to minimize the spatial area between the piston heads 180, thereby delimiting the combustion chamber in the lower cylinder liner 55. Steam is then diverted into the combustion chamber in the lower cylinder liner 55 to force the piston heads 180 in the lower cylinder liner 55 apart, while simultaneously forcing the piston heads 180 in the upper cylinder liner 50 closer together to begin the cycle over again. When the piston heads 180 are forced together, the steam or air present in the combustion chamber escapes through the exhaust port 65. The inlet and exhaust ports 65 may be separate openings in each cylinder liner 50, 55 or the same opening.

Figure 27:
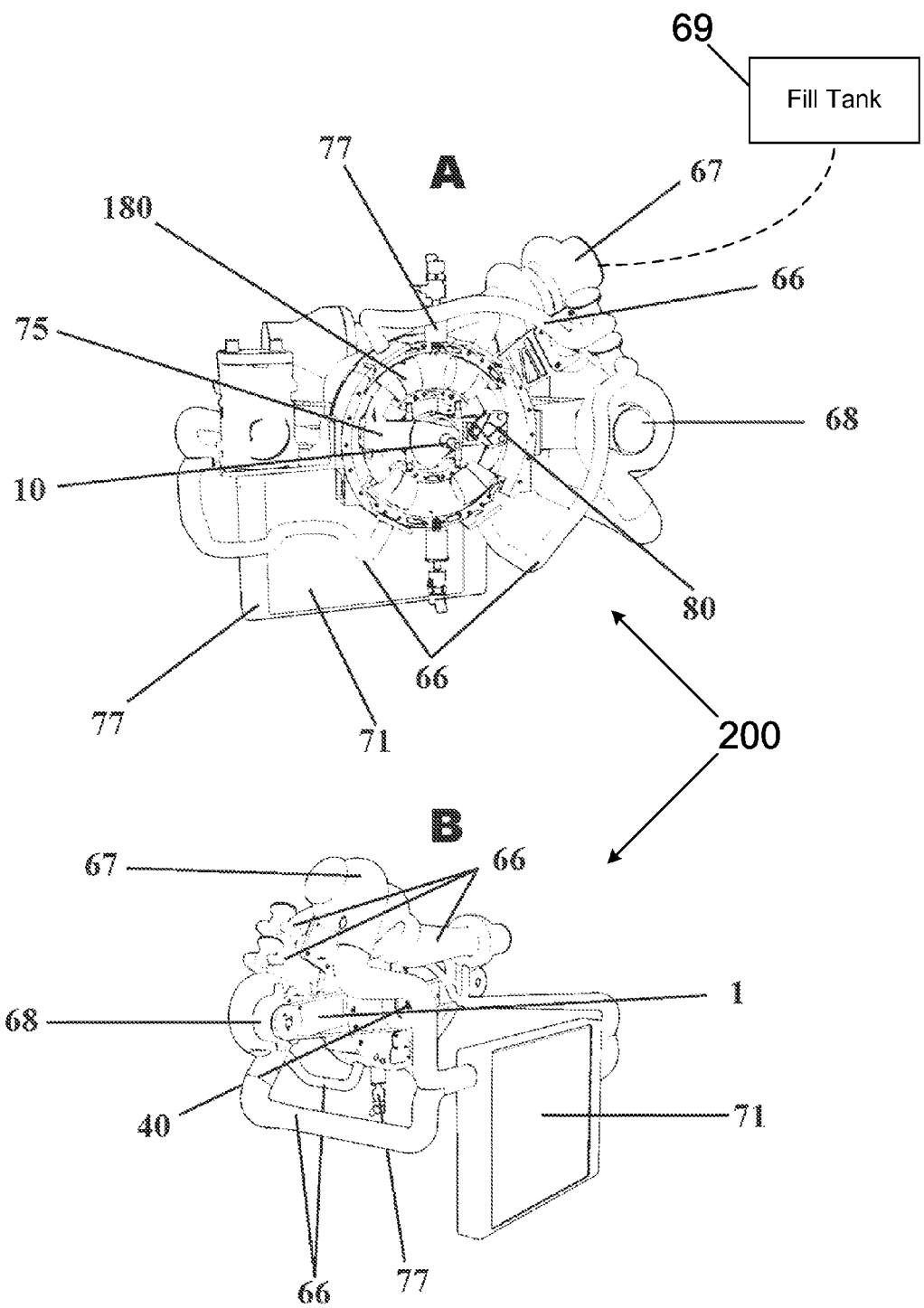
FIG. 27A is an anterior perspective view of an air charge system including the engine assembly of FIG. 1A, a turbocharger, and a supercharger according to one embodiment of the present disclosure.
FIG. 27B is a posterior perspective view of the air charge system of FIG. 27A.

Another aspect of the present disclosure is to provide a forced charge air system 200 that comprises a turbocharger 67 and/or a supercharger 68 in addition to the engine assembly 1 as shown in FIGS. 27A-27B. Both the supercharger 68 and the turbocharger 67 provide air to fill a storage air tank 69 holding a quantity of air at a constant pressure. The constant pressure in the tank allows the combustion chambers in the engine assembly 1 to draw (e.g., scavenge) air once the piston heads and any electronic in-line air valves open to allow the flow of air into the combustion chambers. The pressure and flow of air entering the combustion chamber may depend upon such variables as the opening of in-line air valves, the settings associated with any pressure regulator valves that are utilized, and/or the rotations per minute (RPMs) of the engine 1. When the mass air flow of air is plotted as a function of the revolutions per minute of the engine, the resulting graph may be linear in nature.

One purpose of the supercharger 68 and turbocharger 67 is to sustain the air pressure in the forced charge air system 200 by replenishing the amount of air in the fill tank. The pressure of the flow of air available for scavenging or entering the combustion chambers is equal to combination of the pressure for the air exhausted from the chambers, air supplied as cooling air through the flywheel 5, and the air flowing in the exhaust ducting 66 that leads to the turborcharger 67. The amount of air flowing to the turbocharger 67 can limit the efficiency of the turbocharger 67, thereby, requiring supplemental air arising from the use of a supercharger 68. A supercharger 68 will supplement or supply an additional air volume/pressure to the fill tank. The exhaust of air from the engine 1 through the exhaust ducting 66 and turbocharger 67/supercharger 68 arrangement may be cooled through the use of a radiator 71 prior to being re-circulated for use as supply air for the engine assembly 1.

Another aspect of the present disclosure is to provide a method of operating an internal combustion engine assembly as described above. The method generally comprises providing an engine assembly having a plurality of combustion chambers. Each combustion chamber is delimited by two piston heads 180 and the wall 57 of a cavity located in a cylinder liner 50, 55. Each piston head and combustion chamber defines at least a section of a curved toroidal path with the piston heads adapted to move in opposite directions along this toroidal path. The fuel is injected into the combustion chamber, followed by the combustion of the fuel resulting in the release of chemical energy and the formation of combustion by-products. The release of chemical energy forces the piston heads to move apart. The chemical energy is transformed into mechanical energy via the movement of a primary member as part of the engine assembly that is coupled to each piston head. The mechanical energy so generated is transmitted to at least one crankshaft that is coupled to the primary members. The combustion by-products can be vented from the combustion chamber, followed by the piston heads being forced to move towards one another in order to delimit the combustion chamber, thereby restarting the process or method.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method operating an internal combustion engine, the method comprising the steps of:
   a) providing an engine assembly having a plurality of combustion chambers, each combustion chamber delimited by two piston heads and a wall of a cavity located in a cylinder liner; each piston head being located on a movable primary member; each piston head and combustion chamber defining at least a section of a curved toroidal path; the primary members and piston heads adapted to move in opposite directions along the toroidal path;
   b) injecting a fuel into the combustion chamber;
   c) causing the fuel to combust resulting in the release of chemical energy and the formation of combustion by-products;
   d) forcing the piston heads to move apart due to the release of chemical energy;
   e) transferring the chemical energy into mechanical energy via the movement of the primary member coupled to the piston head;
   f) transmitting the mechanical energy to two crankshafts coupled to at least one of the primary members via an intermediate sub-assembly; each crankshaft located within the diameter of the curved toroidal path;
   g) venting the combustion by-products from the combustion chamber;
   h) causing the piston heads to move towards one another to delimit the combustion chamber; and
   i) repeating steps b)-i);
   wherein the intermediate sub-assembly further comprises a first intermediate member including multiple T-members and first upper and lower extensions, a second intermediate member comprising second upper and lower extensions that couple with the first upper and lower extensions, a halter sub-assembly including multiple planar bearings, and at least one slider sub-assembly;
   wherein the slider sub-assembly is adapted to slidably move within the intermediate sub-assembly with a low level of friction; and
   wherein the halter sub-assembly acts as a horizontal frictional bearing, and wherein the slider sub-assembly and the halter sub-assembly slide linearly along the multiple T-members.

2. An internal combustion engine system that operates with high efficiency when providing power to a vehicle or accessory equipment, the internal combustion engine system comprising:
   an engine assembly with multiple combustion chambers arranged in a toroidal geometry, each combustion chamber being delimited by piston heads positioned on multiple primary members that move in opposite directions and by a cavity established within a cylinder liner; a plurality of crankshafts positioned within the diameter of the toroidal path of the primary members; an intermediate sub-assembly comprised of multiple sliding components that facilitates the movement of the primary members, a flywheel coupled to one crankshaft to force cooling air through the engine assembly; a pulley connected to another crankshaft for use in providing the power necessary to drive the vehicle or accessory equipment; and multiple injectors, each injector adapted to inject fuel into the combustion chamber;
   exhaust ducting coupled to each cylindrical liner for removing air from the engine assembly;
   inlet ducting coupled to each cylindrical liner for supplying air to the engine assembly; and
   a turbocharger connected to the exhaust ducting and the inlet ducting; the turbocharger capable of supplementing the air in the exhaust ducting to ensure that the air in the in-let ducting is at a constant pressure;
   wherein the intermediate sub-assembly further comprises a first intermediate member including multiple T-members and first upper and lower extensions, a second intermediate member comprising second upper and lower extensions that couple with the first upper and lower extensions, a halter sub-assembly including multiple planar bearings, and at least one slider sub-assembly;
   wherein the slider sub-assembly is adapted to slidably move within the intermediate sub-assembly with a low level of friction; and
   wherein the halter sub-assembly acts as a horizontal frictional bearing, and wherein the slider sub-assembly and the halter sub-assembly slide linearly along the multiple T-members.

3. The internal combustion engine system of claim 2, wherein the system further comprises a supercharger connected to the inlet ducting; the supercharger adapted to further supplement the air in the inlet ducting to ensure the air to be at a constant pressure/variable pressure.

4. The internal combustion engine system of claim 2, wherein the system further comprises a fill tank located in the inlet ducting that is configured to store a volume of air at a predetermined pressure in order to ensure that the air supplied to the engine assembly is at a constant pressure.

5. The internal combustion engine system of claim 2, wherein the more than one of the sliding components in the intermediate sub-assembly, primary members, piston heads, or cylinder liners are made from a low friction material and adapted to allow the engine assembly to operate without the need for lubrication from an oil or other flowable lubricant.

6. The internal combustion engine system of claim 2, wherein the engine assembly operates at an in cylinder scavenging efficiency of at least 93%.

7. An engine assembly for use in providing power to a vehicle or accessory equipment, the engine assembly comprising:
   a piston sub-assembly; the piston sub-assembly having an upper cylinder liner, a lower cylinder liner, a first primary member including a first and a second piston head, and a second primary member including a first and a second piston head; the upper and lower cylinder liners each having a cavity with a wall adapted to delimit a combustion chamber within the cylinder liner; each combustion chamber defining at least a section of a torus; the first piston head of both primary members adapted to be received by the cavity in the upper cylinder liner to further delimit said combustion chamber; the second piston head of both primary members adapted to be received by the cavity in the lower cylinder liner to further delimit said combustion chamber;
   an intermediate sub-assembly; the intermediate sub-assembly adapted to facilitate the movement of the first and second primary members in opposite directions along a predetermined toroidal path;
   a top plate having multiple openings;
   a first crank shaft having a central axis;
   a flywheel; the flywheel being supported by the top plate and rotatable by the first crank shaft in order to provide air flow through the engine;
   a base plate having multiple openings;
   a second crank shaft having a central axis;
   a pulley; the pulley being supported by the base plate and rotatable by the second crank;

the pulley being adaptable to provide power to the accessory equipment;
  wherein the radial motion in the engine assembly is aligned with the central axis of the first or second crank shafts;
  wherein the intermediate sub-assembly further comprises a first intermediate member including multiple T-members and first upper and lower extensions, a second intermediate member comprising second upper and lower extensions that couple with the first upper and lower extensions, a halter sub-assembly including multiple planar bearings, and at least one slider sub-assembly;
  wherein the slider sub-assembly is adapted to slidably move within the intermediate sub-assembly with a low level of friction; and
  wherein the halter sub-assembly acts as a horizontal frictional bearing, and wherein the slider sub-assembly and the halter sub-assembly slide linearly along the multiple T-members.

8. The engine assembly of claim 7, wherein the flywheel includes multiple fins to force air through the multiple openings present in the top plate and the base plate.

9. The engine assembly of claim 8, wherein a shape, alignment, and number of the openings in the top plate and in the bottom plate are selected to provide a predetermined amount of air flow around the combustion chamber in the upper cylinder liner and in the lower cylinder liner.

10. The engine assembly of claim 7, wherein the lower and upper cylinder liners include at least one inlet port and at least one exhaust port; the inlet and exhaust ports intersecting with the combustion chamber in the cylinder liner.

11. The engine assembly of claim 10, wherein said intake port intersects with the combustion chamber at an angle in the range of about 30 to 90 degrees.

12. The engine assembly of claim 10, wherein said exhaust port is open for a longer period of time than said intake port.

13. The engine assembly of claim 7, wherein at least one of the upper and lower cylinder liners includes multiple grooves in its outer surface.

14. The engine assembly of claim 13, wherein the at least one of the upper and lower cylinder liners further includes cooling channels through which one selected from a gas and a liquid may flow.

15. The engine assembly of claim 7, wherein at least one of the cylinder liners includes at least one selected from a group of a pressure mount, a spark or glow plug, and a fuel injector.

16. The engine assembly of claim 15, wherein the fuel injector intersects with the combustion chamber in the cylinder liner.

17. The engine assembly of claim 16, wherein the fuel injector sprays fuel into the combustion chamber in a pattern parallel to the surfaces of the piston heads delimiting the chamber.

18. The engine assembly of claim 7, wherein the central axis of the first crank shaft is aligned with the central axis of the second crank shaft.

19. The engine assembly of claim 7, wherein the slider assembly further comprises multiple primary sliders, slider covers, slider cups, side walls, and a top or lid;
  wherein the side walls and top or lid act as frictional planar bearings.

20. The engine assembly of claim 7, wherein at least one selected from the group of primary sliders, slider covers, slider cups, side walls, and top or lid are made from a low friction material.

21. The engine assembly of claim 20, wherein the low friction material is graphite.

22. The engine assembly of claim 7, wherein at least one of the first primary member, the second primary member, the piston heads, the first cylinder member, and the second cylinder member are comprised of one selected from the group of aluminum, steel, a carbon composite, or a ceramic composite.

23. The engine assembly of claim 22, wherein the carbon or ceramic composite is fiber reinforced.

24. The engine assembly of claim 22, wherein the carbon composite is graphite.

25. The engine assembly of claim 7, wherein said first crankshaft and second crankshaft rotate in the same direction.

26. The engine assembly of claim 7, wherein the engine assembly is a steam engine or an internal combustion engine.

27. The engine assembly of claim 7, wherein the intermediate sub-assembly further comprises multiple sliding components to facilitate the movement of the first and second primary members with more than one of the sliding components, piston heads, cylinder liners, and primary members being made from a low friction material and adapted to allow the engine assembly to operate without the need for lubrication from an oil or other flowable lubricant.

* * * * *